United States Patent [19]

Bordeaux

[11] Patent Number: 5,758,023
[45] Date of Patent: May 26, 1998

[54] MULTI-LANGUAGE SPEECH RECOGNITION SYSTEM

[76] Inventor: Theodore Austin Bordeaux, 3990 Mandeville Canyon Rd., Los Angeles, Calif. 90049

[21] Appl. No.: 532,867

[22] Filed: Sep. 21, 1995

Related U.S. Application Data

[63] Continuation of Ser. No. 90,747, Jul. 13, 1993.

[51] Int. Cl.$^6$ .................................................. G10L 5/06
[52] U.S. Cl. .................................... 395/2.41; 395/2.44
[58] Field of Search ............................. 395/209, 2.41, 395/2.44, 2.86, 2.5, 2.64–2.66

[56] References Cited

U.S. PATENT DOCUMENTS

| | | | |
|---|---|---|---|
| 4,536,844 | 8/1985 | Lyon | 607/56 |
| 4,852,170 | 7/1989 | Bordeaux | 395/2.86 |
| 4,882,757 | 11/1989 | Fisher et al. | 395/2.5 |
| 4,905,285 | 2/1990 | Allen | 395/2.41 |
| 4,910,784 | 3/1990 | Doddington et al. | 395/2.6 |
| 4,937,870 | 6/1990 | Bossemeyer, Jr. | 395/2.5 |
| 4,984,177 | 1/1991 | Rondel et al. | 395/2.86 |
| 5,033,087 | 7/1991 | Bahl et al. | 395/2.65 |
| 5,040,127 | 8/1991 | Gerson | 395/2.64 |
| 5,040,215 | 8/1991 | Amano et al. | 395/2.41 |
| 5,278,911 | 1/1994 | Bickerton | 395/2.41 |
| 5,293,584 | 3/1994 | Brown et al. | 395/2.86 |

*Primary Examiner*—David D. Knepper
*Attorney, Agent, or Firm*—Lyon & Lyon LLP

[57] ABSTRACT

Input speech of an arbitrary speaker is automatically transcribed into one of many pre-determined spoken languages by determining, with the frequency discrimination and frequency response of human hearing, the radiated spectrum of a speech input signal, identifying continuously from that spectrum the phones in the signal, aggregating those phones into phonemes, and translating the phonemic string into the pre-determined spoken language for output.

13 Claims, 14 Drawing Sheets

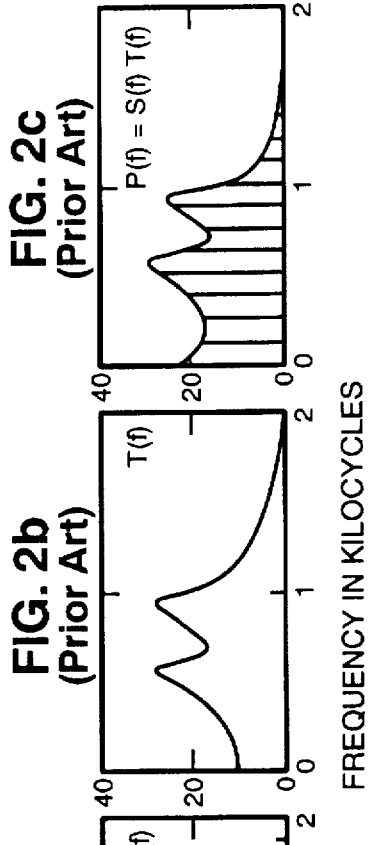
FIG. 2a (Prior Art)
FIG. 2b (Prior Art)
FIG. 2c (Prior Art)
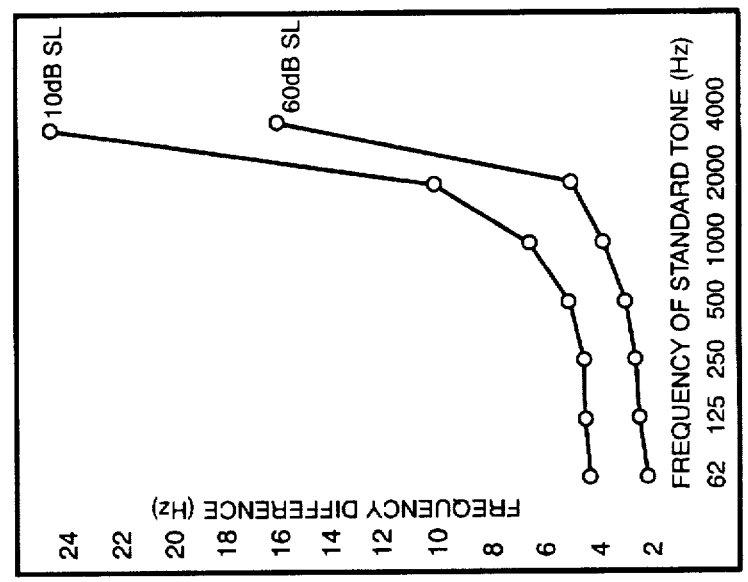
FIG. 3 (Prior Art)

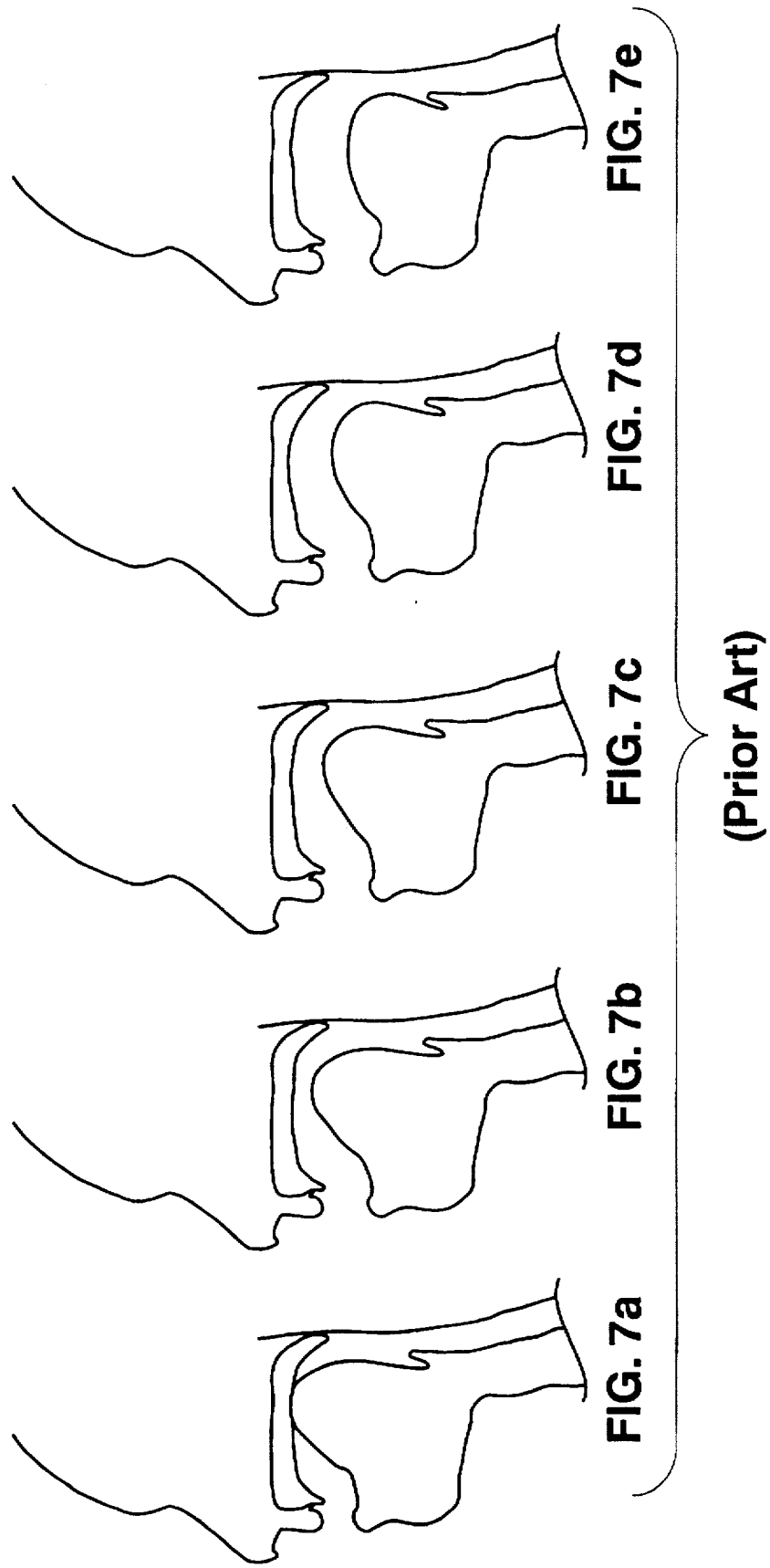

Figure 11a

| | | | | | | | | | |
|---|---|---|---|---|---|---|---|---|---|
| 4 | .. | 0.013AH | 0.000IY | 0.0000W | 0.997N | 0.000R | 0.009W | 0.000xN | 0.000Zr | 0.275Zc |
| 8 | .. | 0.099AH | 0.000IY | 0.0000W | 0.970N | 0.000R | 0.006W | 0.000xN | 0.000Zr | 0.549Zc |
| 12 | .. | 0.073AH | 0.000IY | 0.0000W | 0.827N | 0.000R | 0.001W | 0.000xN | 0.000Zr | 0.991Zc |
| 16 | .. | 0.276AH | 0.000IY | 0.0000W | 0.522N | 0.000R | 0.000W | 0.000xN | 0.000Zr | 0.988Zc |
| 20 | .. | 0.297AH | 0.000IY | 0.0000W | 0.418N | 0.000R | 0.000W | 0.000xN | 0.000Zr | 0.998Zc |
| 24 | .. | 0.308AH | 0.000IY | 0.0000W | 0.710N | 0.000R | 0.000W | 0.000xN | 0.000Zr | 0.998Zc |
| 28 | .. | 0.105AH | 0.000IY | 0.0000W | 0.779N | 0.000R | 0.000W | 0.000xN | 0.000Zr | 1.000Zc |
| 32 | .. | 0.141AH | 0.040IY | 0.0080W | 0.000N | 0.000R | 0.000W | 0.006xN | 0.114Zr | 0.247Zc |
| 36 | .. | 0.159AH | 0.010IY | 0.0280W | 0.001N | 0.000R | 0.000W | 0.042xN | 0.621Zr | 0.093Zc |
| 40 | .. | 0.153AH | 0.007IY | 0.0430W | 0.001N | 0.000R | 0.006W | 0.063xN | 0.416Zr | 0.416Zc |
| 44 | .. | 0.234AH | 0.002IY | 0.0190W | 0.001N | 0.000R | 0.030W | 0.049xN | 0.231Zr | 0.833Zc |
| 48 | .. | 0.252AH | 0.004IY | 0.0230W | 0.001N | 0.000R | 0.029W | 0.016xN | 0.151Zr | 0.917Zc |
| 52 | .. | 0.382AH | 0.008IY | 0.0190W | 0.000N | 0.000R | 0.009W | 0.009xN | 0.089Zr | 0.951Zc |
| 56 | .. | 0.294AH | 0.008IY | 0.0160W | 0.001N | 0.000R | 0.010W | 0.015xN | 0.040Zr | 0.940Zc |
| 60 | .. | 0.194AH | 0.003IY | 0.0080W | 0.000N | 0.000R | 0.008W | 0.001xN | 0.023Zr | 0.988Zc |
| 64 | .. | 0.146AH | 0.003IY | 0.0070W | 0.001N | 0.000R | 0.004W | 0.002xN | 0.032Zr | 0.952Zc |
| 68 | .. | 0.240AH | 0.002IY | 0.0210W | 0.001N | 0.000R | 0.006W | 0.008xN | 0.094Zr | 0.948Zc |
| 72 | .. | 0.280AH | 0.001IY | 0.0350W | 0.003N | 0.002R | 0.010W | 0.014xN | 0.654Zr | 0.361Zc |
| 76 | .. | 0.203AH | 0.002IY | 0.0460W | 0.002N | 0.003R | 0.008W | 0.013xN | 0.543Zr | 0.503Zc |
| 80 | .. | 0.293AH | 0.003IY | 0.0490W | 0.002N | 0.000R | 0.034W | 0.028xN | 0.428Zr | 0.732Zc |
| 84 | Zc | 0.246AH | 0.002IY | 0.0620W | 0.003N | 0.002R | 0.014W | 0.045xN | 0.218Zr | 0.808Zc |
| 88 | .. | 0.194AH | 0.003IY | 0.0400W | 0.001N | 0.000R | 0.005W | 0.034xN | 0.325Zr | 0.722Zc |
| 92 | .. | 0.169AH | 0.001IY | 0.0420W | 0.002N | 0.000R | 0.006W | 0.068xN | 0.340Zr | 0.818Zc |
| 96 | .. | 0.096AH | 0.001IY | 0.0280W | 0.002N | 0.001R | 0.025W | 0.019xN | 0.334Zr | 0.952Zc |
| 100 | .. | 0.222AH | 0.002IY | 0.0310W | 0.001N | 0.003R | 0.021W | 0.007xN | 0.093Zr | 0.973Zc |
| 104 | .. | 0.136AH | 0.002IY | 0.0240W | 0.002N | 0.000R | 0.038W | 0.003xN | 0.123Zr | 0.973Zc |
| 108 | .. | 0.190AH | 0.002IY | 0.0230W | 0.010N | 0.001R | 0.022W | 0.017xN | 0.234Zr | 0.877Zc |
| 112 | .. | 0.158AH | 0.001IY | 0.0130W | 0.026N | 0.006R | 0.008W | 0.012xN | 0.185Zr | 0.904Zc |
| 116 | .. | 0.106AH | 0.002IY | 0.0240W | 0.006N | 0.004R | 0.026W | 0.004xN | 0.249Zr | 0.947Zc |
| 120 | .. | 0.041AH | 0.003IY | 0.0060W | 0.002N | 0.000R | 0.014W | 0.000xN | 0.034Zr | 0.995Zc |
| 124 | .. | 0.031AH | 0.005IY | 0.0070W | 0.001N | 0.000R | 0.015W | 0.000xN | 0.024Zr | 0.996Zc |
| 128 | .. | 0.022AH | 0.004IY | 0.0040W | 0.001N | 0.000R | 0.004W | 0.000xN | 0.013Zr | 0.997Zc |
| 132 | .. | 0.058AH | 0.006IY | 0.0170W | 0.001N | 0.000R | 0.025W | 0.002xN | 0.292Zr | 0.951Zc |
| 136 | .. | 0.042AH | 0.004IY | 0.0050W | 0.004N | 0.000R | 0.013W | 0.004xN | 0.196Zr | 0.912Zc |
| 140 | .. | 0.045AH | 0.000IY | 0.0020W | 0.011N | 0.000R | 0.011W | 0.000xN | 0.047Zr | 0.972Zc |
| 144 | .. | 0.038AH | 0.000IY | 0.0000W | 0.012N | 0.000R | 0.002W | 0.000xN | 0.001Zr | 0.997Zc |
| 148 | .. | 0.040AH | 0.000IY | 0.0000W | 0.007N | 0.000R | 0.003W | 0.000xN | 0.003Zr | 0.986Zc |
| 152 | .. | 0.211AH | 0.000IY | 0.0010W | 0.012N | 0.000R | 0.002W | 0.000xN | 0.012Zr | 0.931Zc |
| 156 | .. | 0.101AH | 0.000IY | 0.0010W | 0.002N | 0.000R | 0.003W | 0.000xN | 0.004Zr | 0.995Zc |
| 160 | Zc | 0.164AH | 0.000IY | 0.0020W | 0.009N | 0.000R | 0.009W | 0.000xN | 0.016Zr | 0.967Zc |
| 164 | .. | 0.202AH | 0.002IY | 0.0130W | 0.001N | 0.000R | 0.043W | 0.004xN | 0.041Zr | 0.983Zc |
| 168 | .. | 0.474AH | 0.004IY | 0.0290W | 0.001N | 0.000R | 0.024W | 0.020xN | 0.143Zr | 0.870Zc |
| 172 | .. | 0.136AH | 0.003IY | 0.0300W | 0.001N | 0.000R | 0.164W | 0.007xN | 0.429Zr | 0.849Zc |
| 176 | .. | 0.144AH | 0.003IY | 0.0150W | 0.002N | 0.000R | 0.060W | 0.030xN | 0.638Zr | 0.424Zc |
| 180 | Zc | 0.101AH | 0.004IY | 0.0160W | 0.001N | 0.000R | 0.050W | 0.005xN | 0.246Zr | 0.745Zc |
| 184 | .. | 0.180AH | 0.006IY | 0.0470W | 0.001N | 0.000R | 0.020W | 0.012xN | 0.649Zr | 0.431Zc |
| 188 | .. | 0.115AH | 0.019IY | 0.0590W | 0.004N | 0.001R | 0.005W | 0.118xN | 0.801Zr | 0.040Zc |
| 192 | Zr | 0.018AH | 0.037IY | 0.0360W | 0.034N | 0.019R | 0.258W | 0.244xN | 0.928Zr | 0.013Zc |
| 196 | .. | 0.026AH | 0.075IY | 0.0790W | 0.045N | 0.029R | 0.743W | 0.208xN | 0.885Zr | 0.029Zc |
| 200 | .. | 0.011AH | 0.055IY | 0.0840W | 0.019N | 0.022R | 0.871W | 0.061xN | 0.761Zr | 0.005Zc |
| 204 | .. | 0.011AH | 0.069IY | 0.2190W | 0.009N | 0.006R | 0.544W | 0.013xN | 0.878Zr | 0.002Zc |
| 208 | .. | 0.002AH | 0.006IY | 0.0760W | 0.005N | 0.045R | 0.477W | 0.006xN | 0.899Zr | 0.003Zc |
| 212 | .. | 0.000AH | 0.001IY | 0.0330W | 0.003N | 0.171R | 0.441W | 0.003xN | 0.795Zr | 0.002Zc |
| 216 | .. | 0.001AH | 0.000IY | 0.0270W | 0.002N | 0.120R | 0.742W | 0.002xN | 0.245Zr | 0.001Zc |
| 220 | .. | 0.002AH | 0.000IY | 0.0110W | 0.004N | 0.207R | 0.407W | 0.109xN | 0.005Zr | 0.001Zc |

Figure 11b

| | | | | | | | | | |
|---|---|---|---|---|---|---|---|---|---|
| 224 | .. | 0.000AH | 0.001IY | 0.0020W | 0.005N | 0.925R | 0.011W | 0.089xN | 0.008Zr | 0.000Zc |
| 228 | .. | 0.000AH | 0.009IY | 0.0020W | 0.006N | 0.940R | 0.011W | 0.126xN | 0.003Zr | 0.001Zc |
| 232 | .. | 0.000AH | 0.013IY | 0.0020W | 0.020N | 0.819R | 0.029W | 0.334xN | 0.011Zr | 0.004Zc |
| 236 | .. | 0.001AH | 0.016IY | 0.0060W | 0.046N | 0.519R | 0.062W | 0.680xN | 0.027Zr | 0.011Zc |
| 240 | .. | 0.001AH | 0.018IY | 0.0060W | 0.070N | 0.425R | 0.037W | 0.835xN | 0.029Zr | 0.008Zc |
| 244 | .. | 0.001AH | 0.015IY | 0.0100W | 0.052N | 0.409R | 0.046W | 0.872xN | 0.030Zr | 0.016Zc |
| 248 | xN | 0.003AH | 0.009IY | 0.0150W | 0.063N | 0.242R | 0.061W | 0.906xN | 0.027Zr | 0.014Zc |
| 252 | xN | 0.005AH | 0.011IY | 0.0190W | 0.066N | 0.223R | 0.054W | 0.915xN | 0.042Zr | 0.026Zc |
| 256 | xN | 0.003AH | 0.009IY | 0.0200W | 0.079N | 0.204R | 0.029W | 0.952xN | 0.028Zr | 0.018Zc |
| 260 | xN | 0.004AH | 0.010IY | 0.0260W | 0.117N | 0.102R | 0.061W | 0.952xN | 0.051Zr | 0.020Zc |
| 264 | xN | 0.005AH | 0.007IY | 0.0290W | 0.104N | 0.102R | 0.056W | 0.935xN | 0.066Zr | 0.019Zc |
| 268 | xN | 0.004AH | 0.007IY | 0.0340W | 0.098N | 0.115R | 0.051W | 0.882xN | 0.079Zr | 0.023Zc |
| 272 | xN | 0.003AH | 0.006IY | 0.0330W | 0.101N | 0.113R | 0.053W | 0.906xN | 0.064Zr | 0.023Zc |
| 276 | xN | 0.004AH | 0.006IY | 0.0350W | 0.125N | 0.081R | 0.053W | 0.917xN | 0.094Zr | 0.019Zc |
| 280 | xN | 0.004AH | 0.004IY | 0.0400W | 0.103N | 0.050R | 0.046W | 0.960xN | 0.068Zr | 0.014Zc |
| 284 | xN | 0.003AH | 0.005IY | 0.0320W | 0.147N | 0.067R | 0.035W | 0.920xN | 0.088Zr | 0.020Zc |
| 288 | xN | 0.004AH | 0.008IY | 0.0480W | 0.096N | 0.034R | 0.052W | 0.964xN | 0.066Zr | 0.016Zc |
| 292 | xN | 0.005AH | 0.007IY | 0.0450W | 0.093N | 0.048R | 0.040W | 0.957xN | 0.075Zr | 0.019Zc |
| 296 | xN | 0.005AH | 0.006IY | 0.0320W | 0.143N | 0.044R | 0.038W | 0.951xN | 0.089Zr | 0.019Zc |
| 300 | N | 0.005AH | 0.000IY | 0.0020W | 0.843N | 0.035R | 0.018W | 0.241xN | 0.125Zr | 0.017Zc |
| 304 | N | 0.003AH | 0.001IY | 0.0020W | 0.833N | 0.016R | 0.031W | 0.187xN | 0.216Zr | 0.005Zc |
| 308 | N | 0.008AH | 0.000IY | 0.0000W | 0.979N | 0.001R | 0.023W | 0.009xN | 0.072Zr | 0.004Zc |
| 312 | N | 0.012AH | 0.000IY | 0.0000W | 0.980N | 0.002R | 0.018W | 0.003xN | 0.092Zr | 0.006Zc |
| 316 | N | 0.014AH | 0.000IY | 0.0000W | 0.988N | 0.004R | 0.011W | 0.006xN | 0.064Zr | 0.006Zc |
| 320 | N | 0.014AH | 0.000IY | 0.0000W | 0.986N | 0.007R | 0.007W | 0.009xN | 0.077Zr | 0.007Zc |
| 324 | N | 0.019AH | 0.000IY | 0.0000W | 0.988N | 0.003R | 0.007W | 0.008xN | 0.092Zr | 0.007Zc |
| 328 | .. | 0.088AH | 0.008IY | 0.0130W | 0.345N | 0.060R | 0.040W | 0.183xN | 0.563Zr | 0.025Zc |
| 332 | .. | 0.060AH | 0.149IY | 0.0480W | 0.187N | 0.186R | 0.015W | 0.189xN | 0.425Zr | 0.030Zc |
| 336 | .. | 0.068AH | 0.181IY | 0.0580W | 0.088N | 0.181R | 0.010W | 0.091xN | 0.453Zr | 0.020Zc |
| 340 | .. | 0.124AH | 0.108IY | 0.0790W | 0.032N | 0.203R | 0.006W | 0.037xN | 0.404Zr | 0.036Zc |
| 344 | .. | 0.197AH | 0.046IY | 0.0990W | 0.028N | 0.067R | 0.008W | 0.056xN | 0.585Zr | 0.038Zc |
| 348 | .. | 0.212AH | 0.023IY | 0.0470W | 0.024N | 0.043R | 0.005W | 0.045xN | 0.443Zr | 0.025Zc |
| 352 | .. | 0.356AH | 0.011IY | 0.0440W | 0.018N | 0.020R | 0.007W | 0.038xN | 0.512Zr | 0.030Zc |
| 356 | .. | 0.493AH | 0.006IY | 0.0370W | 0.020N | 0.016R | 0.006W | 0.034xN | 0.442Zr | 0.026Zc |
| 360 | AH | 0.629AH | 0.006IY | 0.0270W | 0.028N | 0.009R | 0.005W | 0.025xN | 0.376Zr | 0.029Zc |
| 364 | AH | 0.640AH | 0.003IY | 0.0270W | 0.022N | 0.014R | 0.008W | 0.015xN | 0.375Zr | 0.021Zc |
| 368 | AH | 0.722AH | 0.002IY | 0.0240W | 0.015N | 0.015R | 0.007W | 0.010xN | 0.390Zr | 0.023Zc |
| 372 | AH | 0.830AH | 0.001IY | 0.0210W | 0.016N | 0.023R | 0.005W | 0.005xN | 0.289Zr | 0.027Zc |
| 376 | AH | 0.841AH | 0.001IY | 0.0170W | 0.021N | 0.011R | 0.007W | 0.003xN | 0.341Zr | 0.048Zc |
| 380 | AH | 0.859AH | 0.001IY | 0.0170W | 0.014N | 0.025R | 0.006W | 0.003xN | 0.290Zr | 0.024Zc |
| 384 | AH | 0.910AH | 0.000IY | 0.0090W | 0.015N | 0.020R | 0.005W | 0.001xN | 0.221Zr | 0.033Zc |
| 388 | AH | 0.944AH | 0.000IY | 0.0050W | 0.024N | 0.013R | 0.003W | 0.001xN | 0.158Zr | 0.041Zc |
| 392 | AH | 0.948AH | 0.000IY | 0.0050W | 0.028N | 0.035R | 0.001W | 0.001xN | 0.162Zr | 0.033Zc |
| 396 | AH | 0.962AH | 0.000IY | 0.0030W | 0.044N | 0.014R | 0.001W | 0.001xN | 0.104Zr | 0.027Zc |
| 400 | AH | 0.966AH | 0.000IY | 0.0040W | 0.022N | 0.014R | 0.001W | 0.001xN | 0.125Zr | 0.025Zc |
| 404 | AH | 0.968AH | 0.000IY | 0.0040W | 0.022N | 0.006R | 0.001W | 0.001xN | 0.153Zr | 0.050Zc |
| 408 | AH | 0.957AH | 0.000IY | 0.0070W | 0.015N | 0.020R | 0.001W | 0.002xN | 0.178Zr | 0.037Zc |
| 412 | AH | 0.953AH | 0.000IY | 0.0060W | 0.011N | 0.014R | 0.001W | 0.002xN | 0.172Zr | 0.036Zc |
| 416 | AH | 0.958AH | 0.000IY | 0.0080W | 0.005N | 0.009R | 0.001W | 0.003xN | 0.227Zr | 0.035Zc |
| 420 | AH | 0.955AH | 0.000IY | 0.0070W | 0.005N | 0.002R | 0.002W | 0.003xN | 0.282Zr | 0.047Zc |
| 424 | AH | 0.951AH | 0.000IY | 0.0100W | 0.004N | 0.006R | 0.000W | 0.004xN | 0.276Zr | 0.039Zc |
| 428 | AH | 0.936AH | 0.001IY | 0.0130W | 0.004N | 0.009R | 0.001W | 0.004xN | 0.264Zr | 0.049Zc |
| 432 | AH | 0.958AH | 0.001IY | 0.0100W | 0.004N | 0.009R | 0.001W | 0.003xN | 0.172Zr | 0.057Zc |
| 436 | AH | 0.965AH | 0.000IY | 0.0130W | 0.005N | 0.004R | 0.002W | 0.002xN | 0.195Zr | 0.059Zc |
| 440 | AH | 0.953AH | 0.001IY | 0.0170W | 0.004N | 0.010R | 0.001W | 0.003xN | 0.227Zr | 0.051Zc |

Figure 11c

| | | | | | | | | | |
|---|---|---|---|---|---|---|---|---|---|
| 444 | AH | 0.925AH | 0.001lY | 0.0240W | 0.003N | 0.014R | 0.003W | 0.002xN | 0.186Zr | 0.066Zc |
| 448 | AH | 0.959AH | 0.000lY | 0.0110W | 0.004N | 0.012R | 0.002W | 0.002xN | 0.106Zr | 0.054Zc |
| 452 | AH | 0.972AH | 0.000lY | 0.0090W | 0.003N | 0.004R | 0.002W | 0.001xN | 0.111Zr | 0.068Zc |
| 456 | AH | 0.967AH | 0.000lY | 0.0120W | 0.004N | 0.007R | 0.002W | 0.001xN | 0.067Zr | 0.050Zc |
| 460 | AH | 0.915AH | 0.000lY | 0.0160W | 0.002N | 0.012R | 0.003W | 0.001xN | 0.109Zr | 0.055Zc |
| 464 | AH | 0.899AH | 0.000lY | 0.0200W | 0.002N | 0.015R | 0.005W | 0.001xN | 0.073Zr | 0.054Zc |
| 468 | AH | 0.851AH | 0.001lY | 0.0570W | 0.001N | 0.009R | 0.005W | 0.001xN | 0.067Zr | 0.055Zc |
| 472 | AH | 0.877AH | 0.000lY | 0.0750W | 0.001N | 0.006R | 0.006W | 0.001xN | 0.049Zr | 0.069Zc |
| 476 | AH | 0.882AH | 0.001lY | 0.0600W | 0.001N | 0.006R | 0.004W | 0.001xN | 0.080Zr | 0.050Zc |
| 480 | AH | 0.797AH | 0.001lY | 0.1130W | 0.000N | 0.004R | 0.009W | 0.001xN | 0.122Zr | 0.059Zc |
| 484 | AH | 0.737AH | 0.001lY | 0.2290W | 0.000N | 0.002R | 0.009W | 0.001xN | 0.108Zr | 0.038Zc |
| 488 | AH | 0.813AH | 0.001lY | 0.1530W | 0.000N | 0.002R | 0.016W | 0.001xN | 0.115Zr | 0.042Zc |
| 492 | AH | 0.642AH | 0.002lY | 0.1850W | 0.001N | 0.004R | 0.034W | 0.001xN | 0.140Zr | 0.029Zc |
| 496 | .. | 0.458AH | 0.001lY | 0.2000W | 0.001N | 0.006R | 0.129W | 0.001xN | 0.082Zr | 0.023Zc |
| 500 | .. | 0.306AH | 0.002lY | 0.3040W | 0.001N | 0.004R | 0.200W | 0.001xN | 0.088Zr | 0.019Zc |
| 504 | .. | 0.159AH | 0.003lY | 0.5980W | 0.001N | 0.002R | 0.165W | 0.002xN | 0.064Zr | 0.010Zc |
| 508 | OW | 0.134AH | 0.002lY | 0.6180W | 0.001N | 0.004R | 0.118W | 0.002xN | 0.044Zr | 0.016Zc |
| 512 | .. | 0.128AH | 0.003lY | 0.5700W | 0.001N | 0.003R | 0.202W | 0.002xN | 0.023Zr | 0.009Zc |
| 516 | OW | 0.094AH | 0.005lY | 0.7910W | 0.000N | 0.002R | 0.068W | 0.004xN | 0.011Zr | 0.006Zc |
| 520 | OW | 0.243AH | 0.005lY | 0.6290W | 0.001N | 0.002R | 0.019W | 0.006xN | 0.011Zr | 0.008Zc |
| 524 | OW | 0.133AH | 0.009lY | 0.7710W | 0.002N | 0.003R | 0.024W | 0.011xN | 0.006Zr | 0.011Zc |
| 528 | OW | 0.167AH | 0.009lY | 0.7430W | 0.002N | 0.003R | 0.015W | 0.014xN | 0.004Zr | 0.007Zc |
| 532 | OW | 0.215AH | 0.011lY | 0.6210W | 0.003N | 0.003R | 0.017W | 0.017xN | 0.004Zr | 0.012Zc |
| 536 | .. | 0.186AH | 0.016lY | 0.4020W | 0.006N | 0.004R | 0.058W | 0.022xN | 0.012Zr | 0.015Zc |
| 540 | .. | 0.110AH | 0.013lY | 0.5340W | 0.005N | 0.005R | 0.061W | 0.026xN | 0.005Zr | 0.012Zc |
| 544 | OW | 0.139AH | 0.013lY | 0.6210W | 0.003N | 0.005R | 0.018W | 0.029xN | 0.004Zr | 0.011Zc |
| 548 | .. | 0.162AH | 0.015lY | 0.4800W | 0.004N | 0.003R | 0.039W | 0.025xN | 0.006Zr | 0.014Zc |
| 552 | OW | 0.127AH | 0.013lY | 0.6370W | 0.004N | 0.003R | 0.019W | 0.030xN | 0.003Zr | 0.015Zc |
| 556 | OW | 0.075AH | 0.011lY | 0.8370W | 0.003N | 0.002R | 0.009W | 0.036xN | 0.001Zr | 0.012Zc |
| 560 | OW | 0.083AH | 0.010lY | 0.8840W | 0.002N | 0.002R | 0.003W | 0.040xN | 0.001Zr | 0.011Zc |
| 564 | OW | 0.135AH | 0.009lY | 0.9080W | 0.001N | 0.002R | 0.001W | 0.037xN | 0.000Zr | 0.008Zc |
| 568 | OW | 0.149AH | 0.008lY | 0.9320W | 0.001N | 0.001R | 0.001W | 0.056xN | 0.000Zr | 0.005Zc |
| 572 | OW | 0.110AH | 0.008lY | 0.9500W | 0.002N | 0.001R | 0.001W | 0.060xN | 0.000Zr | 0.008Zc |
| 576 | OW | 0.068AH | 0.007lY | 0.9670W | 0.001N | 0.002R | 0.001W | 0.077xN | 0.000Zr | 0.005Zc |
| 580 | OW | 0.074AH | 0.006lY | 0.9580W | 0.002N | 0.002R | 0.001W | 0.080xN | 0.000Zr | 0.004Zc |
| 584 | OW | 0.120AH | 0.008lY | 0.9120W | 0.006N | 0.002R | 0.002W | 0.091xN | 0.000Zr | 0.005Zc |
| 588 | OW | 0.108AH | 0.009lY | 0.9220W | 0.008N | 0.002R | 0.003W | 0.081xN | 0.001Zr | 0.006Zc |
| 592 | OW | 0.066AH | 0.007lY | 0.9520W | 0.007N | 0.002R | 0.006W | 0.060xN | 0.001Zr | 0.005Zc |
| 596 | OW | 0.078AH | 0.006lY | 0.9320W | 0.010N | 0.003R | 0.007W | 0.058xN | 0.001Zr | 0.004Zc |
| 600 | OW | 0.108AH | 0.005lY | 0.8920W | 0.017N | 0.002R | 0.010W | 0.066xN | 0.001Zr | 0.005Zc |
| 604 | OW | 0.119AH | 0.005lY | 0.9030W | 0.015N | 0.002R | 0.011W | 0.050xN | 0.001Zr | 0.006Zc |
| 608 | OW | 0.080AH | 0.006lY | 0.9500W | 0.007N | 0.001R | 0.012W | 0.053xN | 0.000Zr | 0.004Zc |
| 612 | OW | 0.113AH | 0.006lY | 0.9250W | 0.005N | 0.001R | 0.012W | 0.047xN | 0.001Zr | 0.002Zc |
| 616 | OW | 0.158AH | 0.005lY | 0.8660W | 0.007N | 0.001R | 0.027W | 0.043xN | 0.001Zr | 0.002Zc |
| 620 | OW | 0.182AH | 0.005lY | 0.8140W | 0.006N | 0.001R | 0.047W | 0.032xN | 0.002Zr | 0.002Zc |
| 624 | OW | 0.116AH | 0.005lY | 0.8910W | 0.002N | 0.000R | 0.112W | 0.018xN | 0.001Zr | 0.001Zc |
| 628 | OW | 0.087AH | 0.004lY | 0.8600W | 0.002N | 0.000R | 0.154W | 0.024xN | 0.001Zr | 0.000Zc |
| 632 | OW | 0.105AH | 0.003lY | 0.8650W | 0.002N | 0.001R | 0.119W | 0.028xN | 0.000Zr | 0.001Zc |
| 636 | OW | 0.068AH | 0.003lY | 0.9060W | 0.003N | 0.001R | 0.086W | 0.046xN | 0.000Zr | 0.001Zc |
| 640 | OW | 0.065AH | 0.002lY | 0.9280W | 0.002N | 0.000R | 0.075W | 0.040xN | 0.000Zr | 0.000Zc |
| 644 | OW | 0.031AH | 0.001lY | 0.9270W | 0.002N | 0.001R | 0.085W | 0.037xN | 0.000Zr | 0.000Zc |
| 648 | OW | 0.038AH | 0.001lY | 0.9140W | 0.002N | 0.001R | 0.073W | 0.061xN | 0.000Zr | 0.000Zc |
| 652 | OW | 0.037AH | 0.001lY | 0.8610W | 0.004N | 0.003R | 0.053W | 0.102xN | 0.000Zr | 0.001Zc |
| 656 | OW | 0.039AH | 0.001lY | 0.8820W | 0.003N | 0.002R | 0.052W | 0.101xN | 0.000Zr | 0.001Zc |
| 660 | OW | 0.032AH | 0.001lY | 0.8630W | 0.004N | 0.003R | 0.055W | 0.098xN | 0.000Zr | 0.001Zc |

Figure 11d

| | | | | | | | | | |
|---|---|---|---|---|---|---|---|---|---|
| 664 | 0W | 0.041AH | 0.001lY | 0.7480W | 0.004N | 0.004R | 0.119W | 0.092xN | 0.000Zr | 0.001Zc |
| 668 | 0W | 0.035AH | 0.001lY | 0.7640W | 0.004N | 0.003R | 0.159W | 0.091xN | 0.000Zr | 0.001Zc |
| 672 | 0W | 0.037AH | 0.001lY | 0.7660W | 0.005N | 0.003R | 0.156W | 0.104xN | 0.000Zr | 0.001Zc |
| 676 | 0W | 0.026AH | 0.000lY | 0.7600W | 0.005N | 0.004R | 0.121W | 0.115xN | 0.000Zr | 0.001Zc |
| 680 | .. | 0.044AH | 0.000lY | 0.5780W | 0.007N | 0.007R | 0.193W | 0.140xN | 0.000Zr | 0.001Zc |
| 684 | 0W | 0.040AH | 0.001lY | 0.6140W | 0.007N | 0.005R | 0.148W | 0.180xN | 0.000Zr | 0.001Zc |
| 688 | 0W | 0.036AH | 0.000lY | 0.7350W | 0.003N | 0.003R | 0.172W | 0.108xN | 0.000Zr | 0.001Zc |
| 692 | 0W | 0.020AH | 0.000lY | 0.7700W | 0.003N | 0.004R | 0.133W | 0.100xN | 0.000Zr | 0.001Zc |
| 696 | 0W | 0.025AH | 0.000lY | 0.8340W | 0.003N | 0.004R | 0.063W | 0.177xN | 0.000Zr | 0.001Zc |
| 700 | 0W | 0.020AH | 0.000lY | 0.9150W | 0.003N | 0.003R | 0.027W | 0.233xN | 0.000Zr | 0.001Zc |
| 704 | .. | 0.016AH | 0.001lY | 0.9560W | 0.003N | 0.002R | 0.009W | 0.436xN | 0.000Zr | 0.002Zc |
| 708 | .. | 0.013AH | 0.001lY | 0.9550W | 0.002N | 0.003R | 0.004W | 0.534xN | 0.000Zr | 0.003Zc |
| 712 | .. | 0.015AH | 0.001lY | 0.9420W | 0.003N | 0.004R | 0.003W | 0.626xN | 0.000Zr | 0.004Zc |
| 716 | .. | 0.007AH | 0.001lY | 0.9430W | 0.003N | 0.006R | 0.002W | 0.656xN | 0.000Zr | 0.005Zc |
| 720 | .. | 0.006AH | 0.001lY | 0.9560W | 0.002N | 0.004R | 0.001W | 0.646xN | 0.000Zr | 0.008Zc |
| 724 | .. | 0.004AH | 0.001lY | 0.9220W | 0.002N | 0.004R | 0.002W | 0.700xN | 0.000Zr | 0.013Zc |
| 728 | .. | 0.006AH | 0.001lY | 0.8210W | 0.004N | 0.005R | 0.005W | 0.538xN | 0.000Zr | 0.034Zc |
| 732 | .. | 0.005AH | 0.001lY | 0.5480W | 0.010N | 0.004R | 0.039W | 0.741xN | 0.001Zr | 0.045Zc |
| 736 | .. | 0.004AH | 0.002lY | 0.4380W | 0.020N | 0.002R | 0.079W | 0.593xN | 0.001Zr | 0.081Zc |
| 740 | .. | 0.005AH | 0.002lY | 0.3600W | 0.021N | 0.001R | 0.257W | 0.547xN | 0.001Zr | 0.064Zc |
| 744 | xN | 0.004AH | 0.001lY | 0.2990W | 0.024N | 0.003R | 0.243W | 0.631xN | 0.002Zr | 0.057Zc |
| 748 | .. | 0.002AH | 0.001lY | 0.1250W | 0.035N | 0.002R | 0.426W | 0.415xN | 0.001Zr | 0.089Zc |
| 752 | .. | 0.001AH | 0.001lY | 0.1190W | 0.038N | 0.002R | 0.256W | 0.323xN | 0.001Zr | 0.103Zc |
| 756 | .. | 0.001AH | 0.000lY | 0.0110W | 0.104N | 0.012R | 0.205W | 0.068xN | 0.002Zr | 0.219Zc |
| 760 | .. | 0.002AH | 0.000lY | 0.0040W | 0.112N | 0.022R | 0.187W | 0.044xN | 0.003Zr | 0.180Zc |
| 764 | .. | 0.002AH | 0.000lY | 0.0050W | 0.056N | 0.048R | 0.190W | 0.096xN | 0.003Zr | 0.139Zc |
| 768 | .. | 0.001AH | 0.000lY | 0.0040W | 0.057N | 0.084R | 0.093W | 0.073xN | 0.002Zr | 0.143Zc |
| 772 | .. | 0.002AH | 0.000lY | 0.0020W | 0.152N | 0.143R | 0.039W | 0.033xN | 0.003Zr | 0.114Zc |
| 776 | .. | 0.002AH | 0.000lY | 0.0030W | 0.097N | 0.335R | 0.019W | 0.012xN | 0.003Zr | 0.157Zc |
| 780 | .. | 0.002AH | 0.000lY | 0.0020W | 0.073N | 0.349R | 0.028W | 0.007xN | 0.003Zr | 0.331Zc |
| 784 | .. | 0.004AH | 0.000lY | 0.0070W | 0.009N | 0.756R | 0.020W | 0.004xN | 0.002Zr | 0.341Zc |
| 788 | .. | 0.006AH | 0.000lY | 0.0040W | 0.011N | 0.647R | 0.012W | 0.003xN | 0.001Zr | 0.339Zc |
| 792 | .. | 0.007AH | 0.000lY | 0.0100W | 0.008N | 0.735R | 0.004W | 0.005xN | 0.001Zr | 0.180Zc |
| 796 | .. | 0.038AH | 0.000lY | 0.0030W | 0.024N | 0.643R | 0.002W | 0.001xN | 0.000Zr | 0.171Zc |
| 800 | .. | 0.042AH | 0.000lY | 0.0010W | 0.043N | 0.452R | 0.002W | 0.000xN | 0.000Zr | 0.334Zc |
| 804 | .. | 0.063AH | 0.000lY | 0.0010W | 0.040N | 0.303R | 0.001W | 0.000xN | 0.000Zr | 0.312Zc |
| 808 | .. | 0.063AH | 0.000lY | 0.0000W | 0.190N | 0.073R | 0.002W | 0.000xN | 0.000Zr | 0.416Zc |
| 812 | .. | 0.292AH | 0.000lY | 0.0000W | 0.355N | 0.086R | 0.000W | 0.000xN | 0.003Zr | 0.062Zc |
| 816 | .. | 0.139AH | 0.000lY | 0.0000W | 0.338N | 0.030R | 0.000W | 0.000xN | 0.012Zr | 0.157Zc |
| 820 | .. | 0.218AH | 0.000lY | 0.0000W | 0.125N | 0.045R | 0.000W | 0.000xN | 0.001Zr | 0.168Zc |
| 824 | .. | 0.253AH | 0.000lY | 0.0000W | 0.049N | 0.127R | 0.000W | 0.000xN | 0.003Zr | 0.227Zc |
| 828 | .. | 0.332AH | 0.000lY | 0.0000W | 0.072N | 0.008R | 0.000W | 0.000xN | 0.002Zr | 0.312Zc |
| 832 | .. | 0.432AH | 0.000lY | 0.0000W | 0.104N | 0.001R | 0.000W | 0.000xN | 0.008Zr | 0.224Zc |
| 836 | .. | 0.135AH | 0.000lY | 0.0000W | 0.073N | 0.000R | 0.004W | 0.000xN | 0.034Zr | 0.316Zc |
| 840 | .. | 0.158AH | 0.000lY | 0.0000W | 0.053N | 0.000R | 0.007W | 0.000xN | 0.025Zr | 0.479Zc |
| 844 | .. | 0.443AH | 0.000lY | 0.0010W | 0.003N | 0.000R | 0.011W | 0.000xN | 0.182Zr | 0.661Zc |
| 848 | .. | 0.686AH | 0.000lY | 0.0010W | 0.009N | 0.001R | 0.004W | 0.000xN | 0.145Zr | 0.253Zc |
| 852 | .. | 0.593AH | 0.000lY | 0.0020W | 0.010N | 0.000R | 0.008W | 0.001xN | 0.157Zr | 0.428Zc |
| 856 | .. | 0.453AH | 0.000lY | 0.0090W | 0.001N | 0.000R | 0.010W | 0.007xN | 0.484Zr | 0.531Zc |
| 860 | .. | 0.555AH | 0.001lY | 0.0230W | 0.000N | 0.000R | 0.008W | 0.019xN | 0.173Zr | 0.750Zc |
| 864 | .. | 0.294AH | 0.002lY | 0.0140W | 0.001N | 0.000R | 0.009W | 0.025xN | 0.444Zr | 0.545Zc |
| 868 | .. | 0.127AH | 0.002lY | 0.0100W | 0.003N | 0.000R | 0.015W | 0.040xN | 0.563Zr | 0.509Zc |
| 872 | .. | 0.134AH | 0.003lY | 0.0130W | 0.001N | 0.000R | 0.011W | 0.010xN | 0.529Zr | 0.540Zc |
| 876 | .. | 0.145AH | 0.001lY | 0.0080W | 0.002N | 0.000R | 0.036W | 0.015xN | 0.589Zr | 0.719Zc |

5,758,023

MULTI-LANGUAGE SPEECH RECOGNITION SYSTEM

This is a continuation of co-pending application Ser. No. 08/090,747, filed on Jul. 13, 1993 and which designated the U.S.

FIELD OF INVENTION

The present invention relates to speech recognition systems and methods.

BACKGROUND

The prior art includes many systems and methods for transcribing speech. One of the major differences between them is the level of difficulty of the speech recognition task they are intended to perform. The simplest such task is the recognition of a small number of acoustically distinct words spoken in isolation (often called discrete speech). U.S. Pat. No. 4,910,784 to Doddington et al ("Low Cost Speech Recognition System and Method") is an example of the prior art of this class of system. Such systems are useful, for example, for giving a small set of commands to operate a computer, but can not handle continuous speech. A more difficult type task is the identification of one or more designated words occurring in a continuous stream of words or "word spotting". U.S. Pat. No. 4,937,870 to Bossemeyer, Jr. is an example of the prior art of this class of system. Such systems might be used, for example, in a telephone application for identifying key words or phrases within an utterance such as "credit card", "collect", "third party", etc. but can not transcribe continuous speech. A still more difficult type task is the recognition of all words in a complete sentence where the words are spoken in isolation and the grammatical structure of the sentence is prescribed. U.S. Pat. No. 4,882,757 to Fisher et al ("Speech Recognition System") is an example of the prior art of this class of system. Such systems can be useful in applications where the speaker is willing to accept speaking in an un-natural manner to accommodate the needs of the system. An even more difficult speech recognition task is the recognition of all words in a complete sentence when the words are connected (generally referred to as continuous speech), the grammatical structure of the sentence is prescribed and the lexicon is constrained. U.S. Pat. No. 5,040,127 to Gerson ("Continuous Speech Recognition System") is an example of the prior art of this class of system. Such systems can be useful in task-specific applications where the user is aware of the system vocabulary and grammar constraints and able to modify his or her speech pattern accordingly. The most difficult type of task is the recognition of all words in a continuous, spontaneous utterance that may have no structure and indeed may be ungrammatical in form. U.S. Pat. No. 4,852,170 to Bordeaux ("Real Time Computer Speech Recognition System") is an example of the prior art of this class of system.

Systems and methods of speech recognition may also be classified according to whether they are speaker-dependent; i.e., must be trained by a particular speaker prior to that speaker making use of the machine, or whether they are speaker-independent; i.e., a particular speaker need not train the machine prior to using it. A variation of the speaker-dependent type is the speaker-adaptive system which aims to make the training of the machine easier and faster. Speaker-independent systems are more difficult to achieve than are speaker-dependent ones; however, in most applications they have much greater utility. The present system described herein is speaker-independent.

Speech recognition systems and methods further may be classified as to the lowest phonetic unit that they identify. Every system is provided a set of spectral reference patterns for each of the lowest phonetic units to which the incoming speech signal is compared to seek a best match for identification. The largest such unit is a whole word (or small group of words). Systems operating with reasonable accuracy at this phonetic level generally are limited to small-vocabulary, discrete-speech applications. Methods which aim to identify phonemes for aggregation into words are represented in the prior art across classes of speaker-dependent and -independent/discrete- and continuous-speech systems. Difficulty in achieving reliability is encountered in such systems as larger vocabularies introduce more similar sounding words and as multiple speakers introduce different pronunciations of the same words. Methods of identifying phones (i.e., sub-phoneme units of speech) aim to achieve improved reliability by identifying more but smaller segments of the speech signals. The present system described herein includes a method for accurately identifying phones.

Speech recognition systems and methods may be still further classified according to their modelling of the speech process. Some methods describe the process as a series of acoustic events. This model has been applied primarily to phoneme recognition. In such a model, the speech signal is first segmented into occurrence of classes of phonemes such as vowels (/IY/, /OW/, etc.), fricatives (/F/, /S/,etc.), stops (/D/, /T/, etc.) and so forth. Then the specific phoneme within the class is identified. A second model takes the view that it is not possible to analyze the speech process directly but that it can be usefully analyzed in statistical terms. The Hidden Markov Model is an example of this view of the speech process. In this model, segments of the speech signal are considered as (spectral) states of the system and transitions from one state to any other are probabilistic. Each phoneme or phone is described in terms of a sequence of state changes. The probabilities of transition between spectral states of an incoming speech signal are calculated to determine probable correspondence to each of the target sequences to determine probable phoneme or phone identification. It is difficult to achieve high reliability with this method in large vocabulary speaker-independent systems because of the much larger number of possible spectral states compared to the number of spectral states in a speaker-dependent system. A third model views the speech signal as a sequence of spectral patterns; i.e., a directly observable representation of the signal. This is the model that is employed in the present invention as will be described in detail later.

All speech recognition methods are based on comparing the characteristics of the unknown speech signal with a reference set of examples to determine when a "good" match occurs (identification). Thus, another way of classifying speech recognition systems and methods is on the basis of how the reference data is derived to which the unknown speech signal is compared for identifying a word, phoneme or phone. In a "rules are given" system, the system designer provides the machine directly the reference data to be used for determining best matches. The designer devises the shapes of the templates or calculates the state transition probabilities as in a Hidden Markov Model approach. Speaker-independent applications result in a need for a large number of spectral states to accommodate the wide variations in speaker's voices. Spectral states that are similar may be aggregated but at some loss of representational accuracy and hence reliability of identification. In a "rules are learned" system (e.g., an artificial neural network), the designer provides the system with a very large number of examples of spectra of each phone of interest and their identification. The system is run in a training mode and the neural network "learns" how to distinguish one phone from all the others. When run in an application, the neural network determines the probability that the segment of signal encountered is each of the phone possibilities. Selection is made when specified probability threshold criteria are met. This is the method used in the present invention. An important advantage of this approach in speaker-independent applications is that its reliability can be improved with the number of speakers using it.

A final way of classifying speech recognition systems relates to the aids to word identification employed, if any. In a "context-free" scheme, the string of phones or phonemes are compared to lexicon or dictionary entries to identify each word directly. In a "context-assisted" scheme, devices such as allowable word pairs, constrained grammar and/or syntax and the like are used to improve reliability of word identification. The present invention is context-free.

Most of the speech recognition methods described by the prior art can be modified for application to other languages. However, those methods that depend on analytical devices such as allowable word order, grammar and/or syntax to assist in word identification require separate and duplicative effort for cross-language implementation. In an era of global communication and commerce, there is a need for a language-independent system that has not heretofore been addressed by the prior art. The design and implementation of such a system will exploit the overlap in the speech sounds used in different languages. Exploitation of the common usage of sounds between languages requires application of a more detailed understanding of speech production and the resultant speech signal than has been the case in the prior art.

SUMMARY OF THE INVENTION

The prior art has not taught the construction of devices with the capability to mimic human capability to recognize phones; i.e., "a speech sound considered as a physical event without regard to its place in the sound system of a language." (Webster's Ninth New Collegiate Dictionary; Merriam-Webster Inc., Publishers; Springfield, Mass; 1991) "Human languages display a wide variety of sounds, called phones or speech sounds. There are a great many speech sounds, but not an infinite number of them . . . The class of possible speech sounds is not only finite, it is universal. A portion of the total set will be found in the inventory of any human language." (Contemporary Linguistics: An Introduction; William O'Grady, Michael Dobrovolsky, Mark Aronoff; St. Martin's Press; New York; 1989).

It is an object of my invention to provide a system and method for recognizing the total set of speech sounds (or phones) in human languages.

It is another object of my invention to provide a system and method for transcribing the speech of arbitrary speakers in one of many languages including when such speech is continuous and conversational.

It is yet another object of the present invention to provide a system and method for processing the speech signal to yield an accurate determination of all the frequencies contained in that signal and their amplitudes.

It is a further object of the present invention to emulate the human hearing processes to provide a system and method for unique direct observation of the perceived speech signal at very short time intervals.

It is yet another object of the present invention to address the phones in a language as fuzzy sets; i.e., as all speech signals having a probabilistic membership in all phone sets.

It is a still further object of the invention to provide an artificial neural network system and method for determining the probable phone represented during each very short time interval.

It is a further object of the invention to provide a unique method of employing the artificial neural network to identify the time during the utterance of a phone which represents the closest approach of the vocal tract configuration to a target position; i.e., when there is the maximum likelihood of the signal representing the intended phone.

It is another object of the invention to provide a method for accommodating multiple pronunciations of the same word.

It is yet another object of the invention to provide a method of separating words that often are run together in conversational speech due to coarticulation.

It is still another object of the invention to provide a method of exploiting the common usage of some phones between languages so that the inclusion of other languages is efficiently accomplished with the time required for each new language decreasing with the number of languages included.

Exploitation of the common usage of sounds between languages requires application of a more detailed representation of speech production, the resultant coding of the speech signal, and emulation of the neuro-physiological mechanisms of hearing and pattern recognition that decode that signal to allow speech recognition than has been the case in the prior art. The present invention emulates the concurrent processes occurring in humans recognizing speech; i.e., spectrum analysis, speech sound identification and word recognition. The frequency response and sensitivity of human hearing is mimicked, an artificial neural network is included to represent the pattern recognition apparatus of the brain and logical processes are included to emulate our translation of spoken sounds into written words.

These and other objects and features of the present invention will be better understood through a consideration of the following description taken with the drawings in which:

FIG. 2 is an illustration of a simplified source-filter decomposition of a voiced sound. FIG. 2a is a typical source spectrum, 2b is a representative vocal transmission filter function, and 2c is a spectrum of a radiated vowel.

FIG. 3 is a graph of frequency discrimination versus frequency and loudness of a tone.

FIG. 7 shows some estimated articulatory positions assumed during pronunciation of the word "caw". FIG. 7a is the articulatory position for the phoneme /K/, 7e is the position for the /AO/, and 7b, 7c, and 7d are some estimated transition positions between the two.

Figure 8A:
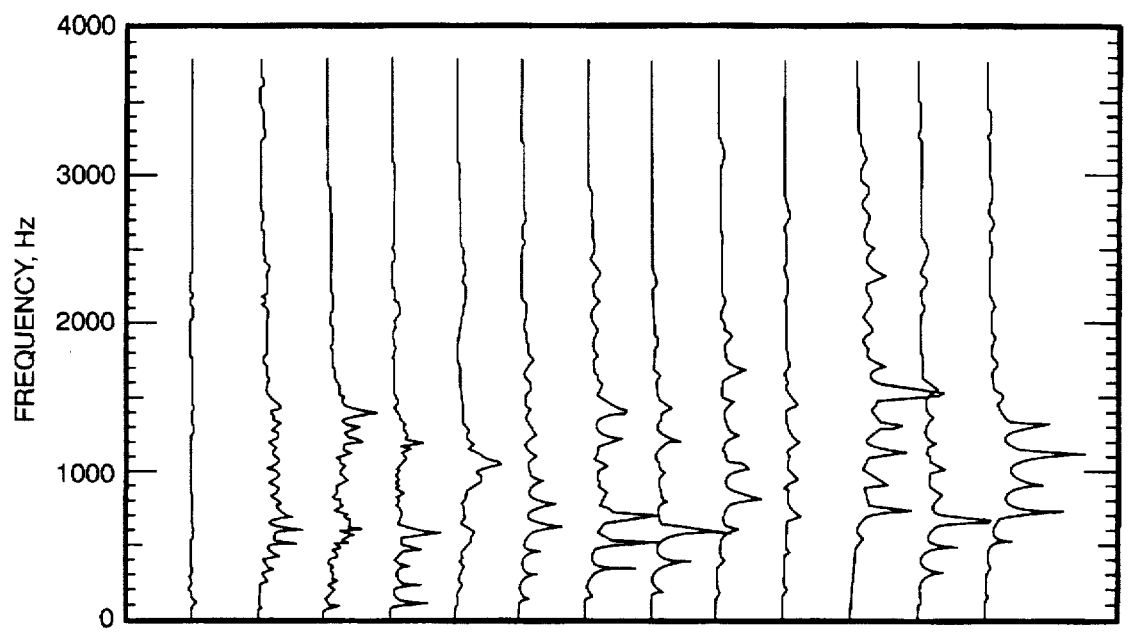
Figure 8B:
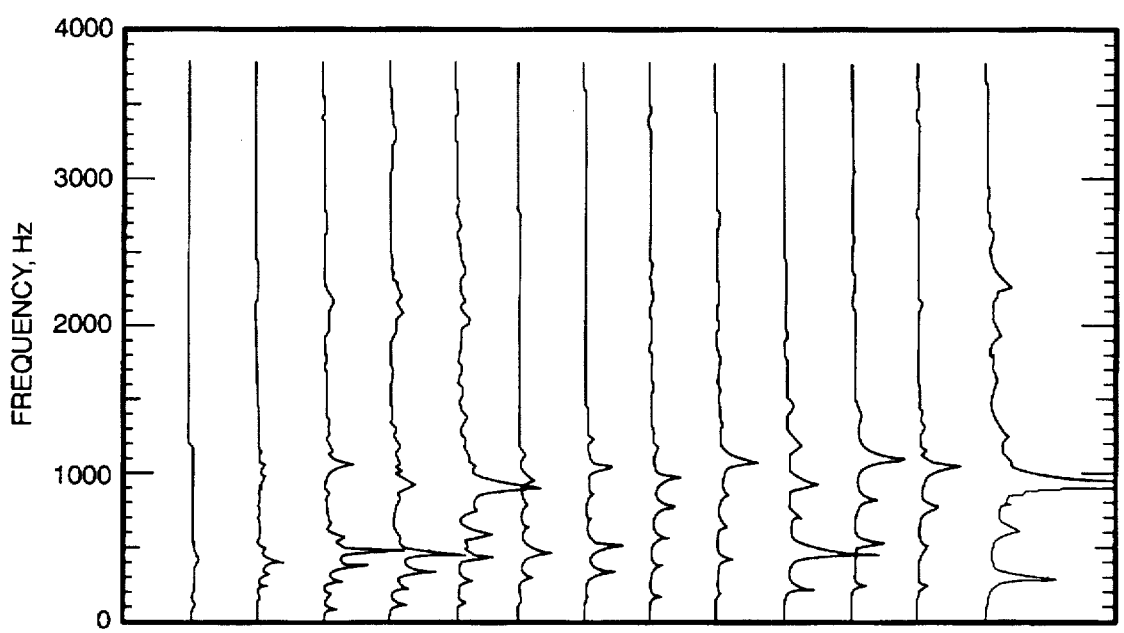

FIG. 8a presents some typical high resolution spectra for the vowel /AH/ and FIG. 8b presents some spectra for the vowel /OW/.

Figure 9:
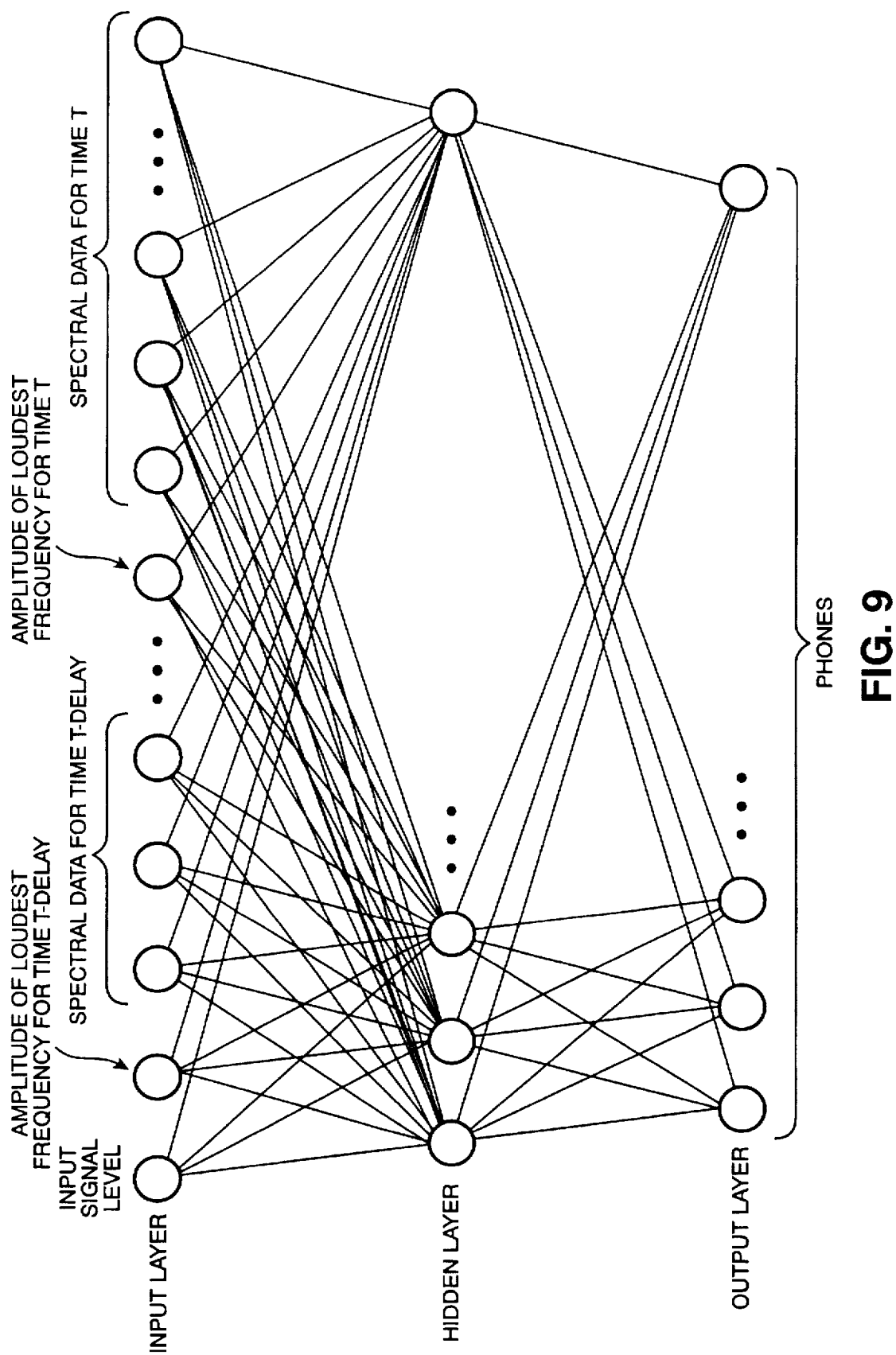

FIG. 9 is a schematic drawing of an artificial neural network phone identifier.

Figure 10A:
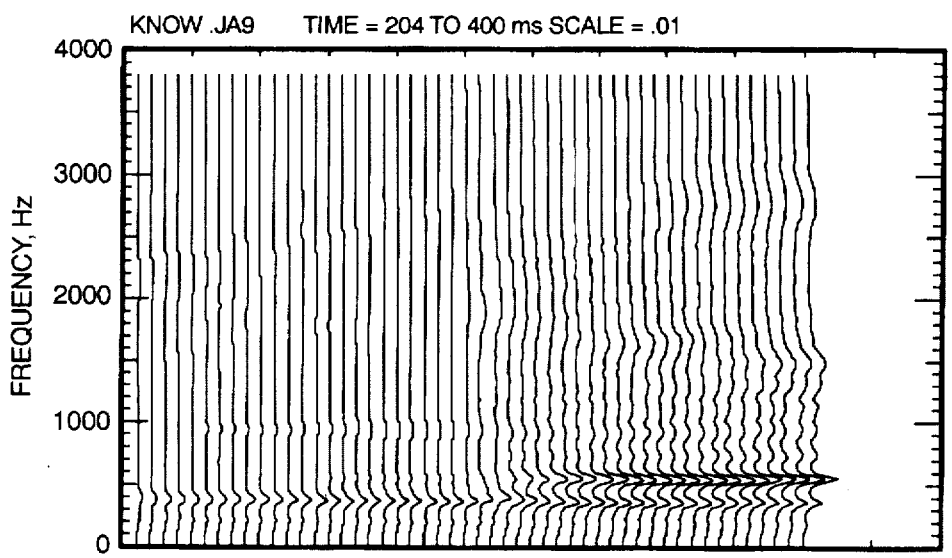
Figure 10B:
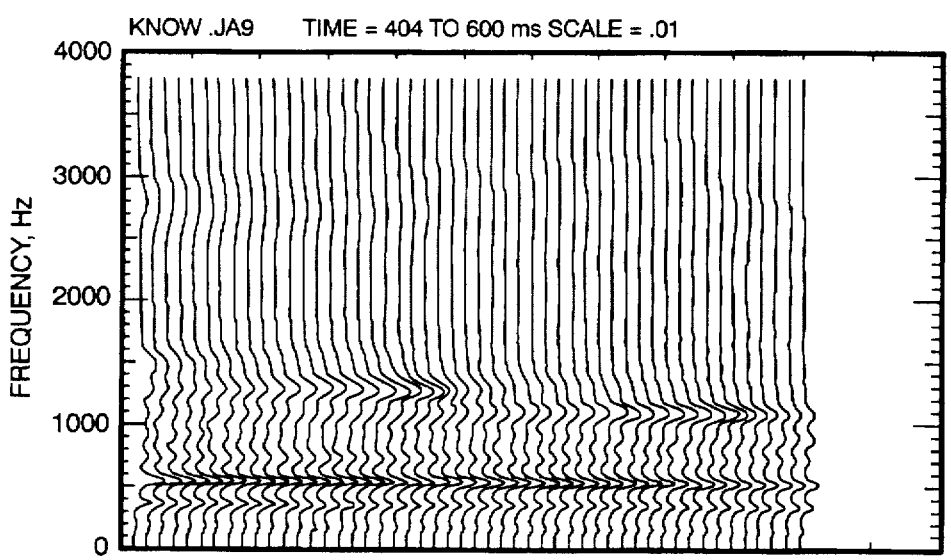
Figure 10C:
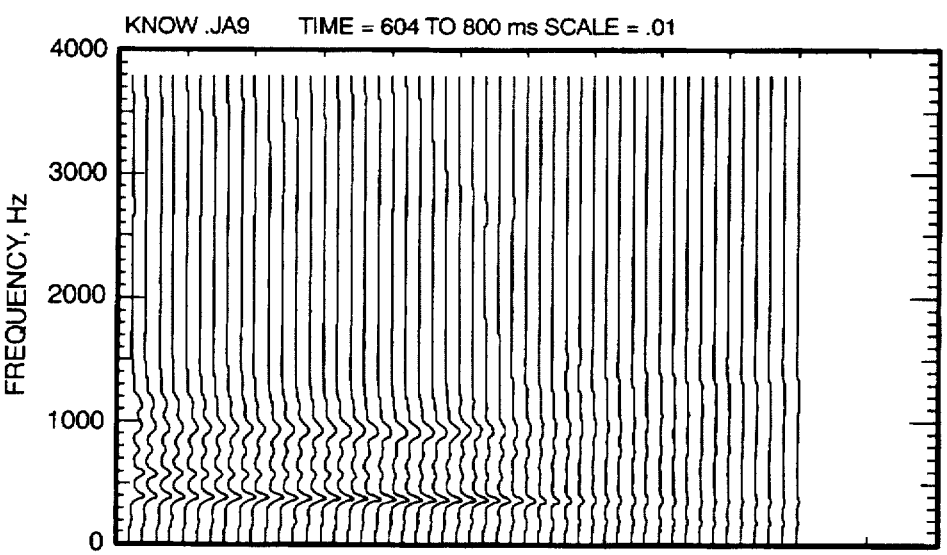

FIG. 10 is a high resolution spectrogram for a particular word sample spoken by a particular speaker shown in three parts for convenience.

FIG. 11a through 11d show a sample output of an artificial neural network phone identifier.

Figure 12:
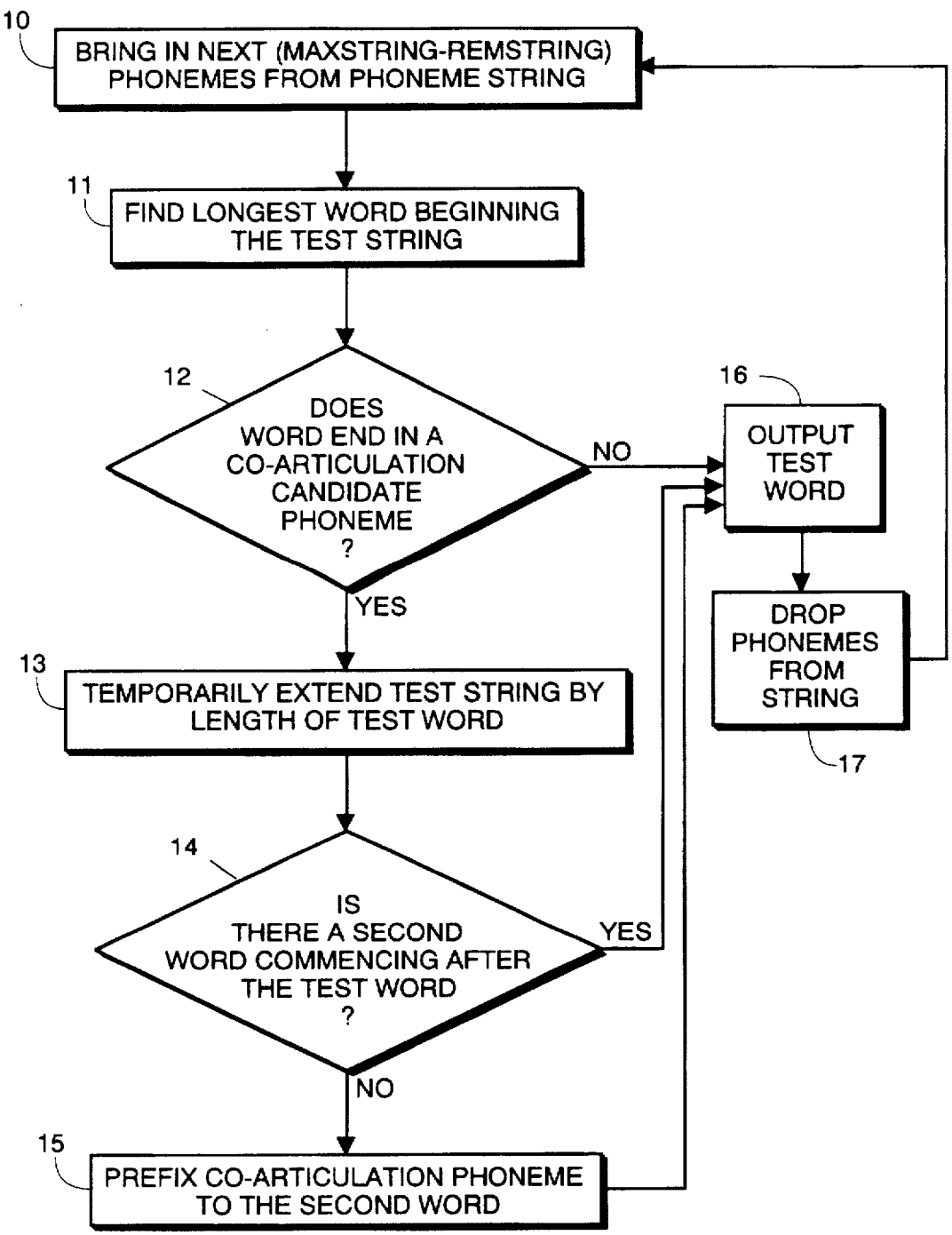

FIG. 12 is a logical diagram of the phonemic-to-spoken language translation program.

Figure 13A:
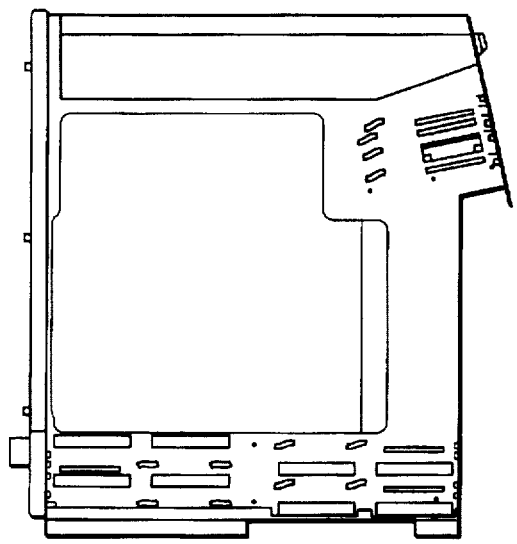
Figure 13B:
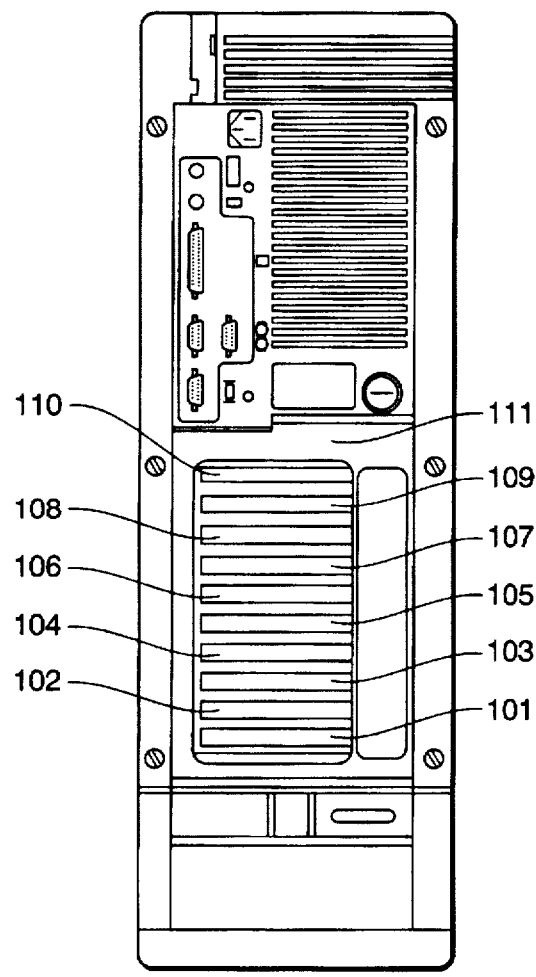

FIG. 13 illustrates an implementation of the present invention on a currently available microcomputer. FIG. 13a is a side view of the computer and FIG. 13b is a rear view of the computer.

DESCRIPTION OF THE INVENTION

Figure 1:
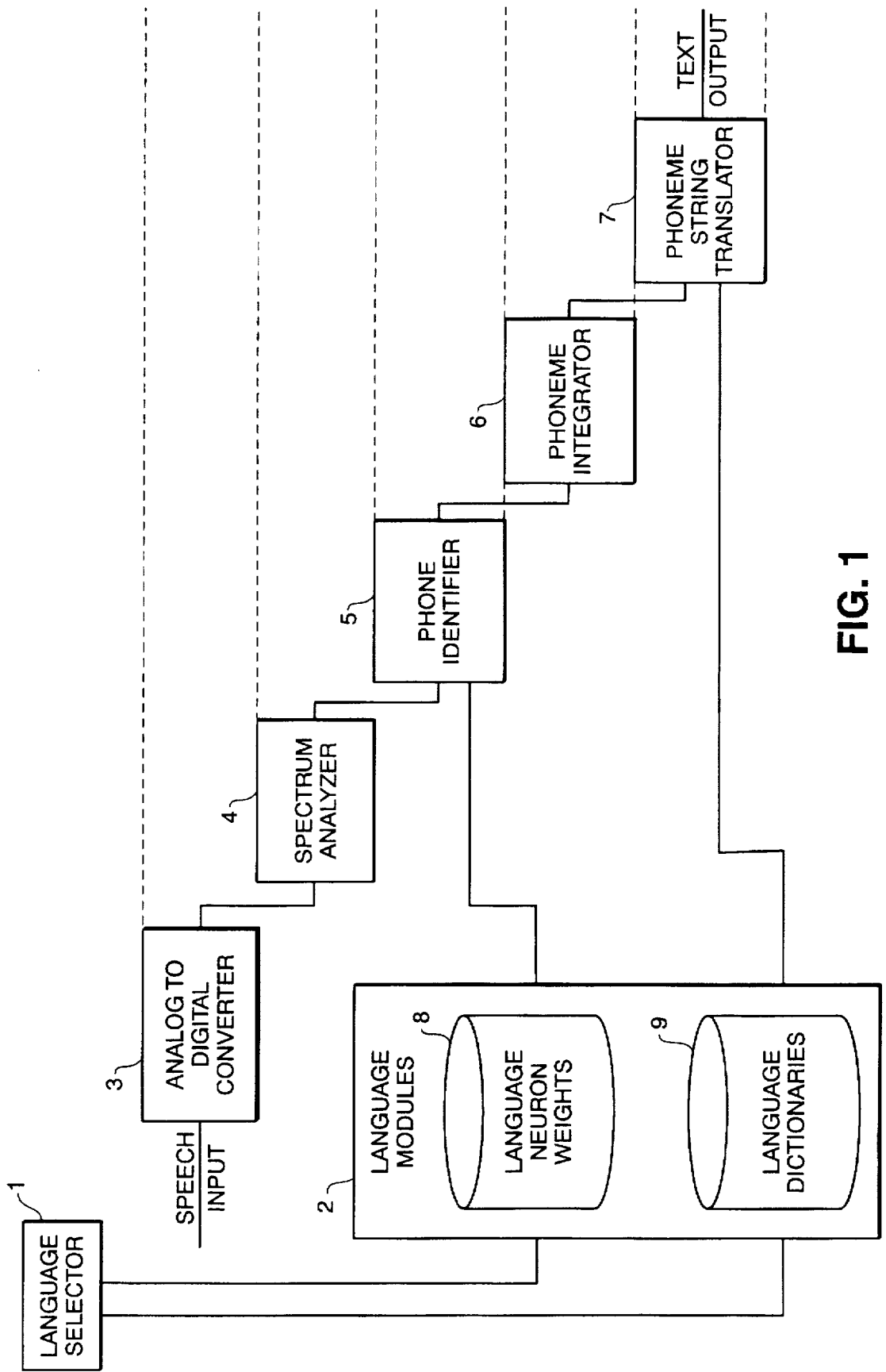
FIG. 1 is a logical diagram of the system.

FIG. 1 is a logical diagram of the system. It includes a language selector 1, language modules 2 stored in non-volatile memory and concurrent processors 3–7 each of which operates on the transformation of the speech signal provided by the previous process. Each language module 2 comprises, for a pre-determined language, the weights for the neural network 8 to be solved for each interval of time and a language dictionary 9 containing the phonemic-to-spoken language translation of the vocabulary words provided. At start-up, the language selector 1 displays a menu of stored languages from which the user selects the one of interest. It retrieves from storage and passes the neural network parameters and weights for that language to the neural network phone identifier 5 and the appropriate language dictionary 9 to the phoneme string translator 7.

Continuous speech signals then are input into a conventional analog-to-digital converter 3 and thence to the spectrum analyzer 4 which operates on the digitized signal concurrently with the analog-to-digital converter processing subsequent signals. The spectrum analyzer 4 is itself a parallel processor as will be described in detail later. The output of the spectrum analyzer 4 is sent to the neural network phone identifier 5 where a phoneme, allophone or other legitimate speech sound in the language is identified (if a phoneme, allophone or other legitimate speech sound is present). This operation takes place concurrently with the analog-to-digital converter 3 and the spectrum analyzer 4 processing further subsequent speech signals. The output of the neural network phone identifier 5 is passed to the phoneme integrator 6 where various tests are made to ensure that real phonemes, allophones and other legitimate speech sounds in the language are separated from fleeting transitions between them and to combine the allophones and other legitimate speech sounds into phonemes. As before, the phoneme integrator 6 is operating on its portion of the speech signal concurrently with the neural network phone identifier 5, the spectrum analyzer 4 and the analog-to-digital converter 3 processing later incoming portions of the speech signal. As the integration of each phoneme is completed, it is sent to the phoneme string translator 7 where it is added onto the end of the existing phoneme string. When there are a pre-determined minimum number of phonemes in the string, the phoneme string translator 7 accesses the language dictionary 9 to parse the string into the words spoken in the speech stream. Each of the parts of the system now will be described in detail.

ANALOG-TO-DIGITAL CONVERTER

A speech signal is input from a source such as telephone, microphone or tape recorder and is digitized by an analog-to-digital converter 3. In the preferred embodiment, the speech recognition system disclosed herein digitizes the incoming signal at 8 KHz and incorporates an anti-aliasing lowpass filter whose response is approximately 60 db down at 4000 Hz from its response from 0 to 3800 Hz. In accordance with the current art, the lowpass filter may be of the analog variety operating on the input signal prior to digitization or a digital filter applied after digitization of the analog signal. The output of the lowpass filter is passed to the spectrum analyzer 4.

SPECTRUM ANALYZER

Before describing the spectrum analyzer 4, it is important to consider the nature of the signal to be analyzed. Fant in his book "Acoustic Theory of Speech Production" (Gunnar Fant; Mouton and Company; The Hague, The Netherlands; 1960) described the spectrum of a radiated speech sound as the product of a source spectrum and a vocal transmission filter function as shown in FIG. 2. The source spectrum is the result of the vibrating vocal cords producing a fundamental frequency and its harmonics which decline in amplitude at 6 db per octave. The fundamental frequency can range from a low of about 60 Hz for a man with a bass voice to almost 400 Hz for a child. The "filter function" results from the shaping of the vocal tract to produce a particular speech sound. In prior art utilizing linear predictive coding to describe a speech sound, the object of investigation has been the filter function. However, the ear receives the entire radiated speech sound, not just the filter function. The linear predictive coding process both distorts the speech signal and discards some of the information it contains. The present invention employs an artificial neural network to identify speech sounds; therefore, it was considered advantageous to retain as much signal information as possible by emulating the human hearing process.

A number of approaches have been utilized in the prior art to simulate human response to speech sounds for example as in U.S. Pat. No. 4,905,285 to Allen et al ("Analysis Arrangement Based on a Model of Human Neural Responses") and U.S. Pat. No. 4,436,844 to Lyon ("Method and Apparatus for Simulating Aural Response Information"). In both these examples of the prior art, the aim is to simulate the output of the cochlea. The present invention addresses the problem not solely as one of simulating the output of the cochlea but one of further representing the speech signal as it is perceived by the brain. For this purpose, it is necessary to provide an arrangement of pseudo-hair cells providing both the frequency discrimination capability and frequency response of human hearing as determined by auditory testing. The results of one such set of tests of frequency discrimination are illustrated in FIG. 3 from "Hearing, Taste and Smell" ; by Philip Whitfield and D. M. Stoddard; Torstar Books; New York; 1985. FIG. 3 shows that human ability to discriminate between two closely spaced tones is dependent on both the amplitude and frequency of the signal. Higher frequency tones must be spaced further apart for discrimination and higher amplitude ones can be discriminated better than can lower ones.

In order to obtain a representation of the radiated spectrum of the speech signal comparable to human auditory perception, the preferred embodiment of the present invention employs a plurality of very narrow bandpass filters spaced from 58 to 3800 Hz according to the 10 db sound level (upper) curve of FIG. 3. Some people with very good hearing still have good speech perception at this signal level. This results in a bank of 420 filters spaced approximately 4 Hz apart beginning at the lowest frequencies increasing to approximately 24 Hz between adjacent filters at the highest frequencies. While this many filters may present a computational challenge to real time operation, it is noted that this is a relatively small number compared to the approximately 10–12,000 hair cells of the cochlea over the same frequency range.

Figure 4:
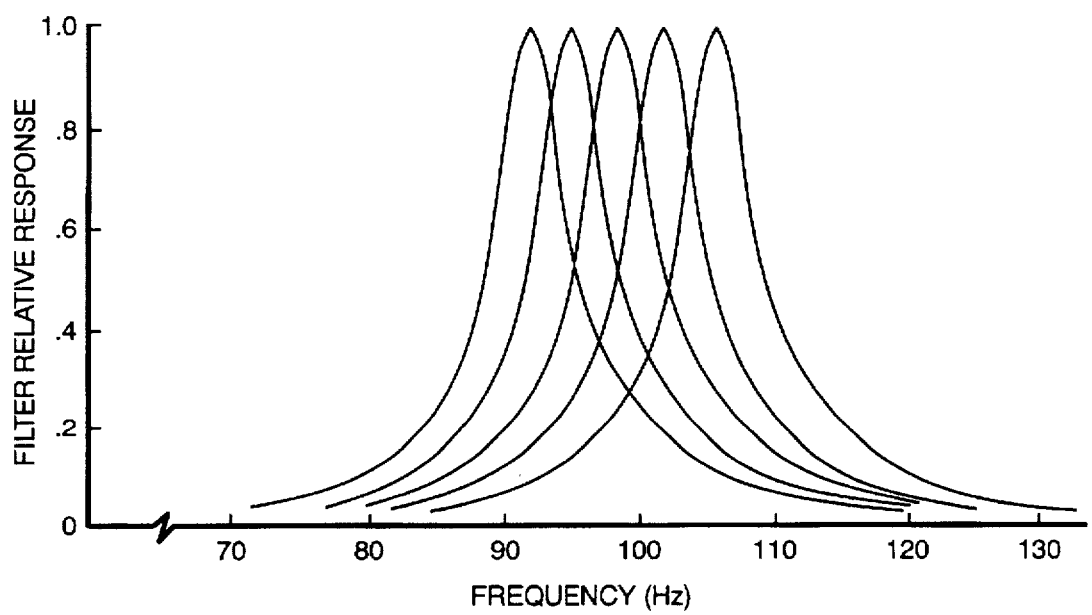
FIG. 4 shows the relative response of some narrow bandpass filters versus frequency.

FIG. 4 is a graphic illustration of a portion of the filter arrangement around 100 Hz. It can be seen from FIG. 4 that because of the filter spacing of about 4 Hz, the true frequency of any signal in this frequency range will be within about 2 Hz of the reported frequency. It is understood that better frequency resolution may be obtained by increasing the number of filters such as by using the frequency discrimination of higher loudness levels in FIG. 3. It is also noted that satisfactory phone recognition might also be obtained with somewhat less frequency resolution; i.e., greater spacing between filters.

The output of each of the bandpass filters is computed for each sample. At an 8 KHz sampling rate, the spacing between samples is 0.125 ms. Modern digital signal processing chips arranged in parallel can provide the processing power required for real-time operation. For example, Loral Space Information Systems has developed an arrangement of five C-programmable Texas Instruments TMS320C30 DSP chips on two plug-in boards (marketed by California Scientific Software as the BrainMaker Professional Accelerator) that can provide adequate computing speed to solve several hundred filters in real time. Alternatively, more compact integrated circuits can be specially designed for the purpose.

The maximum absolute amplitude of each frequency band is determined over a short time interval. The length of that interval is a balance between shortness for accuracy in representing the dynamics inherent in speech patterns, and length to accurately reflect the amplitude of low frequencies. The duration of one complete wave of a 1 KHz tone is 1 ms. One wave of a 500 Hz tone is 2 ms and that of a 250 Hz tone 4 ms. However, a half-wave of 125 Hz tone, the pitch of a typical male voice, is also 4 ms and will contain the maximum value attained in the full wave. In the preferred embodiment of the invention, a constant interval of 4 ms is employed over which to evaluate the maximum absolute value of the amplitude of each frequency band. A longer time period could be used but the presence of lower frequencies does not appear to contribute significantly to intelligibility. Likewise, shorter intervals could be used for higher frequencies, thereby achieving greater accuracy in the time domain for those frequencies. The additional complexity resulting may be tolerated for some speech analysis applications but was not considered cost-effective in the preferred embodiment.

Figure 5:
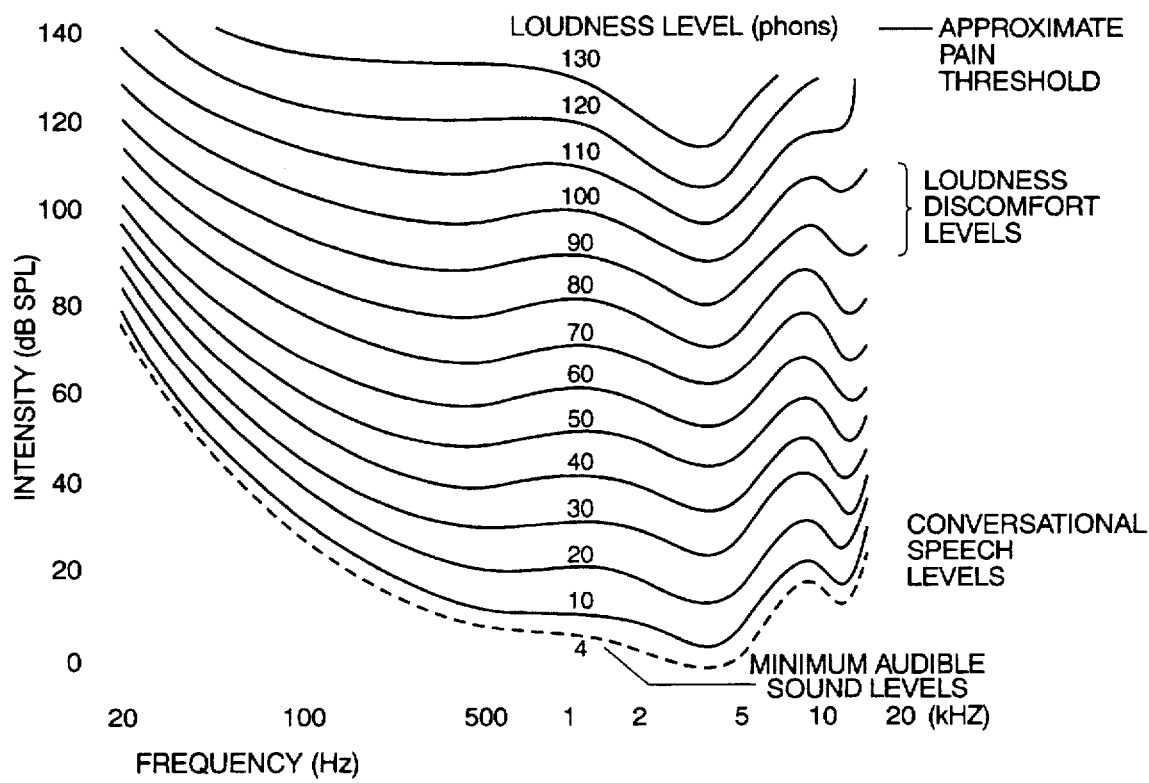
FIG. 5 shows frequency response of human hearing in terms of the intensity of various frequencies required to produce the same perceived loudness.

The output of the spectral analysis filter arrangement is a representation of the speech signal leaving the vocal tract. However, it is well-known that human hearing does not have a flat frequency response. It is considerably less sensitive to the lowest frequencies in the speech spectrum than the higher ones. FIG. 5 illustrates the relative sound level intensity required for perceived equal loudness. Referring to the "10 Loudness Level(phons)" curve of FIG. 5, it can be seen that a signal of about 30 db greater sound pressure level is required for a 100 Hz signal to produce the same perceived loudness as a 1000 Hz signal. The present invention modifies the output of the filter bank to compensate for the frequency response of the ear. In the preferred embodiment, each of the outputs of the bandpass filters is multiplied in the spectrum analyzer 4 by the inverse of the "10 Loudness Level(phons)" curve of FIG. 5. This increases the amplitude of the higher frequencies relative to the lower ones. It can be seen that this has the effect of somewhat compensating for the phenomenon of the amplitudes of the pitch harmonics declining at 6 db per octave as discussed previously.

NEURAL NETWORK PHONE IDENTIFIER

The neural network phone identifier 5 receives the output of the spectrum analyzer 4 and inputs it into its main processor, an artificial neural network that has been trained to identify the speech sounds or phones which make up the speech stream. The artificial neural network is trained by a method described in detail below to recognize not only phonemes but all legitimate speech sounds in a language including such sounds as murmurs occurring before a nasal like "M" and "N", and allophones (or variants) of phonemes; e.g., as is well-known by those skilled in the art of phonetics the acoustic spectrum of the "Z" occurring at the beginning of a syllable is often different from that of a "Z" occurring before a silence. While it is generally accepted that there are only about 40 to 45 phonemes in American English, there are over a hundred different sounds in the language as just illustrated. The term phone is used herein to refer to all such legitimate speech sounds.

Figure 6A:
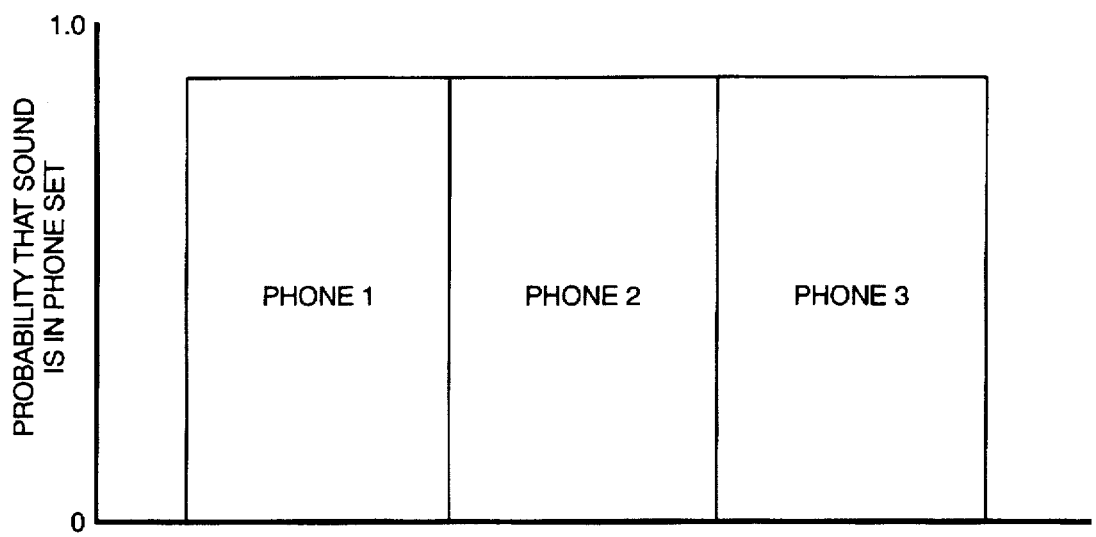
FIG. 6 illustrates three different concepts of speech segmentation.
Figure 6B:
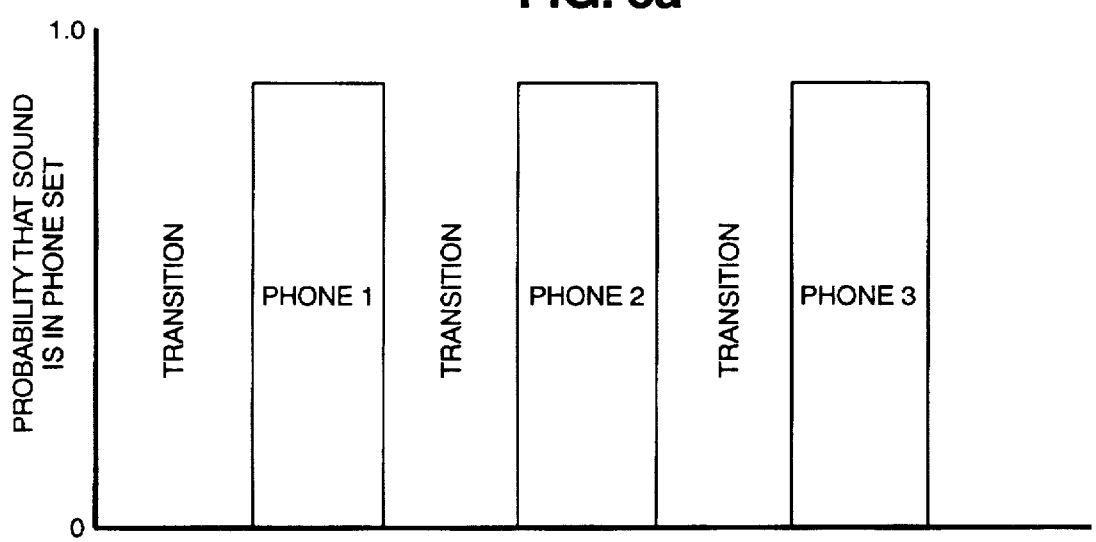
Figure 6C:
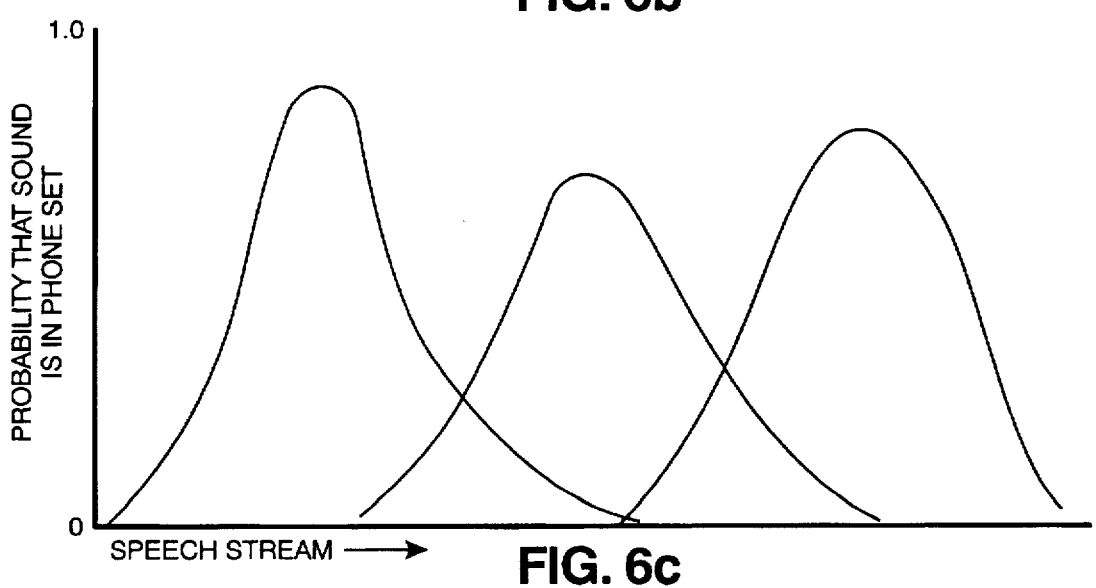

The present invention makes use of a fuzzy set concept of phones. In this concept, every sound made during speech has a probabilistic membership in all fuzzy phone sets. However, it is only when a particular sound's probability of being in a given set is sufficiently high and it's probability of being in any other set is sufficiently low is it labelled by the system as belonging to the given phone set. The differences between this concept and other concepts used in prior art is illustrated in FIG. 6. In the upper diagram (a), all phones (or phonemes) in a speech stream are contiguous; i.e., where one phone (or phoneme) ends, the next one is considered to begin. Furthermore, all sounds in the stream are a part of some phone (or phoneme). In the middle diagram (b), a sound can be part of a phone (or phoneme) or it can occur during a transition from one phone (or phoneme) to the next. However, the occurrence of a phone (phoneme) is a discrete event; the sound either is or is not a phone (or phoneme)—the probability is either zero or one.

The bottom diagram (c) illustrates that sounds in the speech stream can have a probabilistic membership in more than one phone fuzzy set. This follows from the fact that the vocal tract is a variable configuration mechanical device that is constantly being re-shaped to produce the desired sound. There is a unique target position of the vocal tract for each phone. During speech, sounds are continually being produced as the vocal tract is reconfigured to successive positions. FIG. 7 is an illustration of estimated articulatory positions during pronunciation of the word "caw". The leftmost diagram (a) is the estimated target position for the phoneme /K/ and the rightmost diagram (e) is the estimated target position for the phoneme /AO/ ("A Course in Phonetics"; Peter Ladefoged; Harcourt Brace Jovanovich College Publishers; Fort Worth, Tex.; 1993). The middle diagrams (b)–(d) are some estimated positions of the vocal tract assumed during transition between the two target positions. It is clear that as the vocal tract shape is going away from the target position for the /K/, the sound produced will be less and less like that of the /K/. Likewise, as the shape approaches that of the /AO/, the sound produced will be more and more like that of the /AO/. In between the two target positions, the sounds will have varying similarities to the two target phonemes and indeed may have some similarities to other phones.

The artificial neural network is trained by a method described in detail below to identify when a phone is represented by the sound occurring in each 4 ms interval. It does this by solving the matrices representing the network weights applied to the spectral input and computing the probabilities that the sound represents each of the phones. If the probability for one of the phones exceeds a specified threshold, and the probabilities for all other phones are less than one minus that threshold, then the signal in that interval is identified as the phone exceeding the threshold. In one embodiment of the invention, the BrainMaker Professional neural network software produced by California Scientific Software is used both for the training and solution of networks. Other mechanisms for solving neural networks are available such as specialized neural chips with the result that alternative designs for implementing the invention in hardware are possible.

Artificial neural networks have been applied successfully to a variety of pattern recognition and correlation tasks. Methods of configuring, training and solving artificial neural networks are well-known to those skilled in the art. In order to apply one effectively to phone recognition, methods of providing it information necessary and sufficient for it to be able to recognize the speech sounds of an arbitrary speaker are required. Two conditions must be satisfied for accurate recognition. First, the description of the speech signal presented to the artificial neural network (for training and recognition) must be of sufficiently high resolution to allow it to distinguish between phones in a relatively crowded speech band. And second, the network must have previously been trained with the speech samples of a sufficient number and diversity of speakers of the language to ensure that the speech patterns on which it is trained are representative of the speech patterns of the full population. The spectrum analyzer 4, being designed to provide resolution response and resolution similar to that of human hearing, satisfies the first condition. Regarding the second condition, the empirical results obtained in training the neural network phone identifier 5 for reducing this invention to practice show that speech samples from hundreds of speakers are required to achieve adequate coverage of male and female speakers with low to high pitch voices and a wide range of individual linguistic mechanisms. The numbers of different speakers required is discussed further below in connection with training the neural network. FIGS. 8a and 8b show the spectra of a few of the hundreds of examples of the vowels "AH" (as in "nut") and "OW" (as in "note") presented to the ANN for training. As can be seen from FIG. 8, there is not only a great range of variation within a given phone but a great deal of similarity between the two phones.

Artificial neural networks typically have an input layer of neurons, an output layer and one or more hidden layers. A schematic diagram of the preferred embodiment of the phone recognition network is shown in FIG. 9. The output layer of neurons is simply each of the phones of the spoken language. The input layer is spectral data for the current time interval and a previous one. As shown in FIG. 9, the first neuron represents a measurement of the speech signal input level. The remaining neurons are two sets of input data which capture the rapidly changing dynamics of some phones such as stops by describing the signal spectrum at a previous interval and at the current one. The separation between the two intervals is selected to emphasize the differences in the spectra. In the preferred embodiment, the separation is 32 ms. It is understood that the optimal separation may be different for different languages and even for different dialects and regional accents in a given language. In each of the two sets, the first neuron gives the maximum amplitude of any frequency occurring in that time interval and the remaining ones describe the signal spectrum relative to that maximum. As indicated previously, an artificial neural network may incorporate one or more hidden layers of neurons. Those skilled in the art of artificial neural network construction will recognize that no dependable theories or rules-of-thumb have yet been devised to determine either the optimum number of hidden layers or the optimum number of neurons in a hidden layer. In accordance with standard practice in the field, the number of neurons in the hidden layer(s) is determined empirically by testing hidden layers with different numbers of neurons to identify the one yielding the best performance in terms of accuracy in correctly identifying the phones in the speech signals of speakers not included in the population of those on which the network was trained.

TRAINING THE NEURAL NETWORK

Training the neural network includes preparing data to represent the speech characteristics of as much of the expected user population as possible. Speech samples are recorded using sets of words to be uttered that contain in each set one or more examples of each of the specific phones desired. One way of training a system for the one hundred plus phones in American English is to train the neural network on individual sets of approximately ten phones each and combining those sets into larger and larger training sets. It is important to include speakers in each training set whose collective voices span the range of pitch frequencies of voices expected to be encountered in the application. For example, if only men's voices are needed, a range from about 60 to about 150 Hz should be adequate; if only women's voices are needed, a range of about 130 to 350 Hz will be required. If children's speech also is to be recognized, the range will be extended perhaps as high as 400 Hz.

It is important to have a more or less uniform distribution of numbers of pitch voices over the desired range. The preferred embodiment of the disclosed invention has approximately forty frequency bands over the range of voice pitches. It can be estimated statistically that about fifty different speakers for each voice pitch should yield high confidence of population representation. It will be observed in collecting speech samples for training the system that voice pitches will tend to cluster about certain frequencies in approximately normal distributions separately for men and women (and children also if included). In collecting speech samples for training the proof-of-principle system of the present invention, it was found for that particular sample population that there were fewer men's voices between 60–100 Hz and 130–150 Hz than between those ranges. Likewise there were fewer women's voices in the 150–180 Hz and 250–350 Hz ranges than in between. It can be expected to find a surplus of mid-frequency pitches to be discarded and additional effort required to get a sufficient number of high and low pitch voices to achieve desired uniformity in pitch distribution.

The most important part of the training process is to select the "best" times to represent each phone in a sample word; i.e., the times at which the probabilities are highest that the spectra belong to the fuzzy sets of the sample phones. Referring again to FIG. 6, those times are the peaks of the curves for the 3-phone word shown in (c). It is extremely helpful in selecting the times to view the output of the spectrum analyzer in graphical form. FIG. 10 is a high resolution spectrogram for the word "KNOW" uttered by subject JA9. (It can be observed from the figure that the subject is probably a woman since the voice pitch is about 180 Hz.) The duration of the displayed portion of the recording is 600 milliseconds; the figure is split into three 200 ms parts for convenience of display. Each tick mark at the top edge of each part represents 20 ms.

Both the murmur before, and the weak plosive release of, the phone "N" around 300 ms are clear. Thus the selection of the "best" times for these phones is facilitated. Selection of best times for other phones such as vowels may not be so clear cut. This subject, like many others from whom speech samples were taken, inserted the phoneme "AH" (as in "nut") between the "IN" and the "OW" so that the pronounced word was N:AH:OW. Thus the phoneme "OW" does not occur at around 480 ms as might be supposed from FIG. 10 (and if one is not aware as phoneticians are that the phoneme /AH/ is frequently inserted) but instead around 576 ms.

A representative output of the neural network phone identifier 5 for the sample word KNOW.JA9 is displayed in Figures 11a–11d. It can be seen from FIG. 11 that at some times (such as around 200 ms) the signal has a significant probability of belonging to more than one phone set as was discussed in connection with FIG. 6c. Likewise note the increasing probability for the murmur (xN) before the N, then its probability decreasing while the probability of the N increases. Subsequently the probability of the N decreases while the probability of the AH increases, and then the probability of the AH decreases while the probability of the OW increases.

The times selected initially for the thousands of phone examples in a given training set perhaps will not be the ones representing the times of maximum probability for at least some of the phones. During training, the neural network is looking for consistent patterns. Therefore, after training, the trained neural network should be applied to the sample words and significant differences between the phone input times and those identified by the neural network as being the highest probability times spotted. The non-optimum sample times then can be adjusted and the training repeated. This process should be iterated until the differences reach an acceptably low level. In addition, testing of the system on new subjects after the system is trained may result in low probabilities of phone recognition for some speakers. The data for such speakers can be fed back into further training of the system to improve performance.

This same technique is used when training the system for a new language. Speech samples from speakers of the new language are tested using the existing trained network in order to identify those phones for which the system already gives satisfactory results versus those that need to be trained specifically for that language. It is understood that those phones in the new language that are not common to a previous language will have to trained on speech samples from the new language.

PHONEME INTEGRATOR

The artificial neural network identifies which phone (if any) occurs in each time interval. However, some phonemes such as vowels are of sustained duration. One function of the phoneme integrator 6 is to separate legitimate phones from non-phonetic transitions by imposing a requirement for a pre-determined minimum number of consecutive identifications to confirm recognition. In the preferred embodiment of the disclosed invention, eight consecutive identifications (equivalent to 32 milliseconds duration) is required to confirm recognition of a vowel, three consecutive identifications for semi-vowels and fricatives and only one for stops and other plosives. Another of its functions is to ensure that both a murmur phone (of sufficient duration) and a release phone are present for phonemes such as voiced stops before recognition is confirmed. The output of the phoneme integrator is the phonemic representation of the speech stream.

PHONEME STRING TRANSLATOR

The function of the phoneme string translator 7 is to identify, separate and display (or output to a file) the spoken language words represented by the phoneme string. The major components of the translator are a phonemic-spoken language dictionary and a computer program that uses that dictionary to convert the phoneme string into words spelled in the spoken language. An important feature of the dictionary is the use of multiple phonemic entries for many of the natural words. This is rendered necessary because (a) people with different accents often pronounce a given word differently and (b) transitions from one phone to another are sometimes a third phone. An example of (a) is the often different pronunciation of the word "harbor" by natives of the Northeastern United States compared to those in the Midwest. An example of (b) is the frequent transitional "AH" between an "N" and an "OW" and the insertion of a "W" between an "OW" and an "AH" so that the word "Noah" can have at least the phonemic spellings of /N:OW:AH/, /N:AH:OW:AH/, /N:OW:W:AH/ AND /N:AH:OW:W:AH/. The phonemic-spoken language dictionary has, and uses, all these entries to separate the phoneme string into spoken language words.

The computer program design is based on identifying words in the context of a longer string of phonemes and to specifically address and account for co-articulation effects such as gemination. Before describing the program it is useful first to identify a frequently occurring phonetic situation not addressed in the prior art. When one spoken word ends in a given phoneme, especially a stop or a fricative, and the next word begins with the same phoneme, the two phonemes are seldom enunciated separately. Identifying the location of word separation is made more complex for a speech recognition system than when such a situation does not obtain. For example, the utterance "bad dog" can not be properly separated without factoring in gemination of the ending and beginning "d". Otherwise the alternatives are "bad og" and "ba dog"; neither of which identify both words correctly. In a small vocabulary application, such a situation may be avoided by restricting words included in the lexicon but can not be in the unlimited vocabulary application for which this invention is intended. It is noted that there are numerous phonemes that are gemination candidates including all of the stops and fricatives and some of the affricates.

The computer program is designed to anticipate possible gemination occurrences. A logical diagram of the computer program is shown in FIG. 12. The approach involves using a phoneme string longer than any single word likely to be encountered. The preferred embodiment of the invention is based on a 20 phoneme string length (called MaxString in procedure 10 of FIG. 12). The first 20 phonemes in an utterance (or the actual length if the utterance is less than 20 phonemes long) is examined in procedure 11 to find the longest possible first word. If that word does not end in a gemination candidate, it is output in procedure 16, the next phoneme becomes the new starting point in procedure 17, the 20 phoneme length is replenished in procedure 10, and the process repeated. If the longest first word does end in a gemination candidate, procedure 13 extends temporarily the MaxString by a number of phonemes equal to the number of phonemes in the test word, then procedure 14 determines whether there is a following word in the extended Max-String. This indicates that the phoneme following the gemination candidate was not co-articulated with the last phoneme in the preceding word. If there is a following word, procedure 16 outputs the test word, the next phoneme becomes the new starting point in procedure 17, the 20 phoneme length is replenished in procedure 10, and the process repeated. If there is not a second word commencing after the test word (indicating that co-articulation has occurred), procedure 15 inserts a duplicate of the co-articulation candidate phoneme at that point. As before, procedure 16 outputs the test word, the next phoneme becomes the new starting point in procedure 17, the 20 phoneme length is replenished in procedure 10, and the process repeated. This set of procedures is repeated as long as there are phonemes produced by the phoneme integrator 6.

It should be noted that although the basic design of the system described above assumes that the user normally will select a specific language to be transcribed prior to use, the system can be modified to automatically determine which of the languages within its repertoire is being spoken and to select the appropriate artificial neural network and language dictionary for use. This can be accomplished by processing a brief initial portion of the speech, say 5 to 10 seconds in duration, through each of the languages to identify the language that produces a string of real words. The language for which the system identifies a string of real words is selected and the system operates from that point on as described above.

SYSTEM IMPLEMENTATION IN HARDWARE

The method and system disclosed herein may require concurrent processing for real time operation unless implemented on a "super computer"; however, it is intended primarily for widespread use and the preferred implementation is on a "personal computer" or "workstation" class of machine. While the equipments of several manufacturers may have suitable characteristics for some of the various components of the system, a particular arrangement as shown in FIG. 13 will be described for purposes of illustration. As mentioned above, Loral Space Information Systems has developed an arrangement of five C-programmable Texas Instruments TMS320C30 DSP chips on two plug-in boards 105 and 106 that can provide adequate computing speed for solving the equations for several hundred narrow bandpass filters in real time. A second set of boards 103 and 104 can be dedicated to solving the neural network equations. These two sets of boards can be installed for example in a Compaq SystemPro Model 66M microcomputer which has provision for two independent processor boards 110 and 111 that can share the same memory installed on boards 108 and 109. One of these processors accomplishes the phoneme integration 6 function while the other serves as both as the control processor for language selection and to provide Phonemic-to-Spoken Language Translation and text output. Another plug-in board 107 such as the Media Vision Pro Audio Spectrum 16 can provide the analog-to-digital conversion function and its accompanying software can support waveform display and editing for assembling speech samples for language training and testing. The SystemPro computer has two remaining empty slots available.

What is claimed is:

1. A multi-language, speaker-independent, continuous speech, substantially unconstrained vocabulary speech recognition system comprising a language selector for selecting from a plurality of languages a particular language to be recognized, a store of neuron weights representing a plurality of artificial neural networks pre-trained to recognize phonemes, allophones of phonemes, and other speech sounds having meaning in each of said plurality of languages, each of said plurality of artificial neural networks being designed to operate without the use of a Markov model, a store of phonetic-natural language dictionaries for each of said plurality of languages, an analog-to-digital converter for converting speech sounds into digital information, a high-resolution spectrum analyzer for receiving said digital information from said analog-to-digital converter and for determining, to within a range of plus or minus two hertz accuracy, frequencies contained in said digital information at successive time intervals of four milliseconds or less, and for determining amplitudes of each of said frequencies, a phone identifier for receiving said frequency and amplitude information from said spectrum analyzer during each of said time intervals and identifying said phonemes, allophones of phonemes, and other speech sounds having meaning in the language being spoken in each of said time intervals, said phone identifier comprising a selected one of a plurality of artificial neural networks corresponding to said particular language to be recognized, a phoneme integrator for determining when there has been a sufficient consecutive number of identifications of each particular said phoneme, allophone of a phoneme, or other speech sound having meaning in said particular language to be recognized, to meet an established duration criterion for existence of said particular phoneme, allophone of a phoneme, or other speech sound having meaning in said particular language to be recognized, said phoneme integrator providing as an output a phonetic representation of said speech sounds, and a phoneme string translator for identifying, separating and displaying or storing to a file, natural language words represented by said phonetic representation of said speech sounds.

2. The system of claim 1, wherein said language selector is capable of accepting a selection as to which particular language is to be recognized.

3. The system of claim 1, wherein said spectrum analyzer comprises a plurality of narrowband filters, a distance between center frequencies of said narrowband filters being spaced according to a minimum frequency differential required for human hearing to distinguish between two tones of said center frequencies of said narrowband filters.

4. The system of claim 1, wherein said plurality of artificial neural networks are capable of being trained to recognize phonemes, allophones of phonemes, and other speech sounds having meaning in each of said plurality of languages.

5. The system of claim 1, wherein said phonetic-natural language dictionaries are capable of containing multiple pronunciations of each stored word.

6. The system of claim 1, wherein said system is capable of displaying or storing to a file, text of continuous conversational speech of an arbitrary speaker speaking one of said plurality of languages.

7. The system of claim 1, wherein each of said artificial neural networks is capable of identifying a specific number of time intervals within an overall occurrence of said phoneme, allophone of a phoneme, or a speech sound having meaning in the language being spoken, at which a vocal tract configuration most closely approaches a target configuration of said phoneme, allophone of a phoneme, or other speech sound having meaning in the language being spoken.

8. The system of claim 1, wherein said system is capable of addressing and accounting for coarticulation effects, such as gemination, which occur in conversational speech.

9. A method for multi-language, speaker-independent, continuous speech, unconstrained vocabulary speech recognition comprising the following steps:

selecting a particular language to be recognized from a plurality of languages, receiving and converting speech sounds into digital information, receiving said digital information and determining, to within a range of plus or minus two hertz accuracy, frequencies contained in said digital information, at successive time intervals of four milliseconds or less, and determining amplitudes of each of said frequencies, receiving said frequency and amplitude information during each of said time intervals and identifying said phonemes, allophones of phonemes, and other speech sounds having meaning in said particular language to be recognized in each of said time intervals, determining when there has been a sufficient consecutive number of identifications of each particular said phoneme, allophone of a phoneme, or other speech sound having meaning in said particular language to be recognized, to meet an established duration criterion for existence of said particular phoneme, allophone of a phoneme, or other speech sound having meaning in said particular language to be recognized, providing as an output a phonetic representation of said speech sounds, and identifying, separating and displaying or storing to a file, natural language words represented by said phonetic representation of said speech sounds.

10. The method of claim 9, wherein the step of identifying said phonemes, allophones of phonemes, and other speech sounds having meaning in said particular language to be recognized in each of said time intervals, further comprises the following steps:

identifying a specific number of time intervals within an overall occurrence of said phoneme, allophone of a phoneme, or a speech sound having meaning in said particular language to be recognized, at which a vocal tract configuration most closely approaches a target configuration of said phoneme, allophone of a phoneme, or other speech sound having meaning in said language to be recognized.

11. The method of claim 9, further comprising the following step:

addressing and accounting for coarticulation effects, such as gemination, which occur in conversational speech.

12. The method of claim 9, wherein said method is capable of transcribing continuous conversational speech of an arbitrary speaker into a written form of a predetermined language to be spoken by said arbitrary speaker.

13. A multi-language, speaker-independent, continuous speech, unconstrained vocabulary speech recognition system comprising a language selector for selecting from a plurality of languages a particular language to be recognized, a store of neuron weights representing a plurality of artificial neural networks pre-trained to recognize phonemes, allophones of phonemes, and other speech sounds having meaning in each of said plurality of languages, each of said plurality of artificial neural networks being designed to operate without the use of a Markov model, a store of phonetic-natural language dictionaries for each of said plurality of languages, an analog-to-digital converter for converting speech sounds into digital information, a high-resolution spectrum analyzer for receiving said digital information from said analog-to-digital converter, and for determining, to within a range of plus or minus two hertz accuracy, frequencies contained in said digital information at successive time intervals, wherein each of said time intervals is a fixed duration, said duration being selected from a range between one-quarter (0.25) and eight (8) milliseconds, and for determining amplitudes of each of said frequencies, a phone identifier for receiving said frequency and amplitude information from said spectrum analyzer during each of said time intervals and identifying said phonemes, allophones of phonemes, and other speech sounds having meaning in said particular language to be recognized in each of said time intervals, said phone identifier comprising a selected one of a plurality of artificial neural networks corresponding to said particular language to be recognized, a phoneme integrator for determining when there has been a sufficient consecutive number of identifications of each particular said phoneme, allophone of a phoneme, or other speech sound having meaning in said language to be spoken, to meet an established duration criterion for existence of said particular phoneme, allophone of a phoneme, or other speech sound having meaning in said particular language to be recognized, said phoneme integrator providing as an output a phonetic representation of said speech sounds, and a phoneme string translator for identifying, separating and displaying or storing to a file, natural language words represented by said phonetic representation of said speech sounds.

* * * * *

UNITED STATES PATENT AND TRADEMARK OFFICE
CERTIFICATE OF CORRECTION

PATENT NO      :   5,758,023
DATED          :   May 26, 1998
INVENTOR(S)    :   Theodore Austin Bordeaux It is certified that error appears in the above-identified patent and that said Letters Patent is hereby corrected as shown below:

In column 11, line 11, delete "IN" and insert therefor "N".

Signed and Sealed this

Twenty-first Day of September, 1999

Attest:

Q. TODD DICKINSON

*Attesting Officer*          Acting Commissioner of Patents and Trademarks